United States Patent
Hashimoto et al.

(10) Patent No.: US 8,153,044 B2
(45) Date of Patent: Apr. 10, 2012

(54) HEAT TREATMENT OF THERMOPLASTIC FILM, AND THERMOPLASTIC FILM AND METHOD FOR PRODUCING THE SAME

(75) Inventors: Kiyokazu Hashimoto, Minami-Ashigara (JP); Tetsuya Yoshida, Fujinomiya (JP); Masaaki Otoshi, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 853 days.

(21) Appl. No.: 12/104,826

(22) Filed: Apr. 17, 2008

(65) Prior Publication Data

US 2009/0042005 A1 Feb. 12, 2009

Related U.S. Application Data

(60) Provisional application No. 60/986,305, filed on Nov. 8, 2007.

(30) Foreign Application Priority Data

Apr. 20, 2007 (JP) .................................. 2007-111930

(51) Int. Cl.
  *B29C 71/00* (2006.01)
  *B29D 7/01* (2006.01)
  *B29D 11/00* (2006.01)

(52) U.S. Cl. ...................... 264/235.8; 264/1.34; 264/1.6; 264/2.6; 264/2.7; 264/235; 264/235.6; 264/290.2; 264/291; 264/346

(58) Field of Classification Search ........................ None
See application file for complete search history.

(56) References Cited

U.S. PATENT DOCUMENTS

| | | | | |
|---|---|---|---|---|
| 3,570,052 A | * | 3/1971 | Reade | 425/335 |
| 3,652,759 A | * | 3/1972 | Schlemmer et al. | 264/235.8 |
| 3,679,791 A | * | 7/1972 | Reade | 264/342 RE |
| 6,881,457 B2 | | 4/2005 | Tasaka et al. | |
| 7,611,652 B2 | * | 11/2009 | English et al. | 264/210.5 |
| 2006/0078693 A1 | | 4/2006 | Ishibashi et al. | |
| 2008/0199703 A1 | * | 8/2008 | English et al. | 428/409 |
| 2009/0021671 A1 | * | 1/2009 | Fukagawa et al. | 349/96 |
| 2009/0036667 A1 | | 2/2009 | Hashimoto et al. | |

(Continued)

FOREIGN PATENT DOCUMENTS

CN 1509416 6/2004

(Continued)

OTHER PUBLICATIONS

JP Office Action dated Oct. 11, 2011 with English Translation.

(Continued)

*Primary Examiner* — Jeffrey Wollschlager
(74) *Attorney, Agent, or Firm* — Young & Thompson

(57) ABSTRACT

A thermoplastic film is transversely stretched, and then transported in a heat-treating zone (46) such that the ratio (G/D) of an inter-roll distance (G) to a roll lap length (D) is 0.01 to 3, and the ratio (V2/V1) of an exit-side transporting speed (V2) to an entry-side transporting speed (V1) is 0.6 to 0.999. The thermoplastic film is heat-treated in the heat-treating zone (46) at $(Tg-20)°$ C. to $(Tg+50)°$ C., in which Tg is the glass transition temperature of the film. The heat-treated thermoplastic film exhibits an Rth/Re ratio of at least 0.5 and less than 1, an Rth/Re ratio range of 0.01 to 0.1 in the width direction, and a thermal dimensional change of 0.001% to 0.3% under conditions of 80° C. and 200 hours.

11 Claims, 4 Drawing Sheets

U.S. PATENT DOCUMENTS

| | | |
|---|---|---|
| 2009/0128748 A1 | 5/2009 | Sasada |
| 2009/0169772 A1* | 7/2009 | Yamada et al. ................ 428/1.1 |

FOREIGN PATENT DOCUMENTS

| | | | |
|---|---|---|---|
| CN | 1523376 | | 8/2004 |
| JP | 2001-305342 | | 10/2001 |
| JP | 2002-036266 | | 2/2002 |
| JP | 2002-248639 | | 9/2002 |
| JP | 2003251693 | * | 9/2003 |
| JP | 2006-133720 | | 5/2006 |
| JP | 2007-86755 | | 4/2007 |
| JP | 2007-108529 | | 4/2007 |
| WO | 03/076985 | | 9/2003 |
| WO | WO2006093243 | * | 9/2006 |
| WO | 2006/126717 | | 11/2006 |
| WO | WO2006132367 | | 12/2006 |

OTHER PUBLICATIONS

Chinese Cerificate of Invention Patent—ZL200810092197.0-Jul. 13, 2011.

Chinese Certificate of Invention Patent—ZL 200810092197.0-Jul. 13, 2011.

* cited by examiner

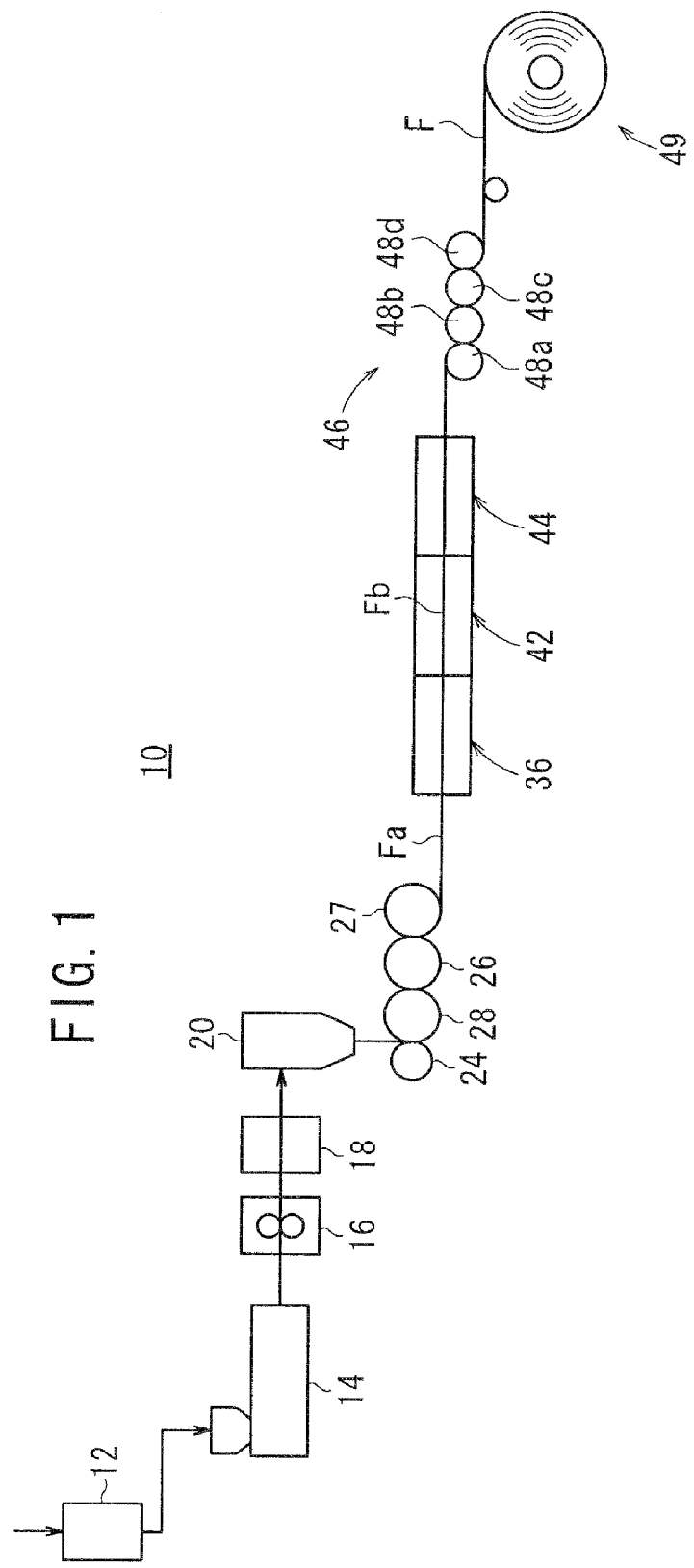

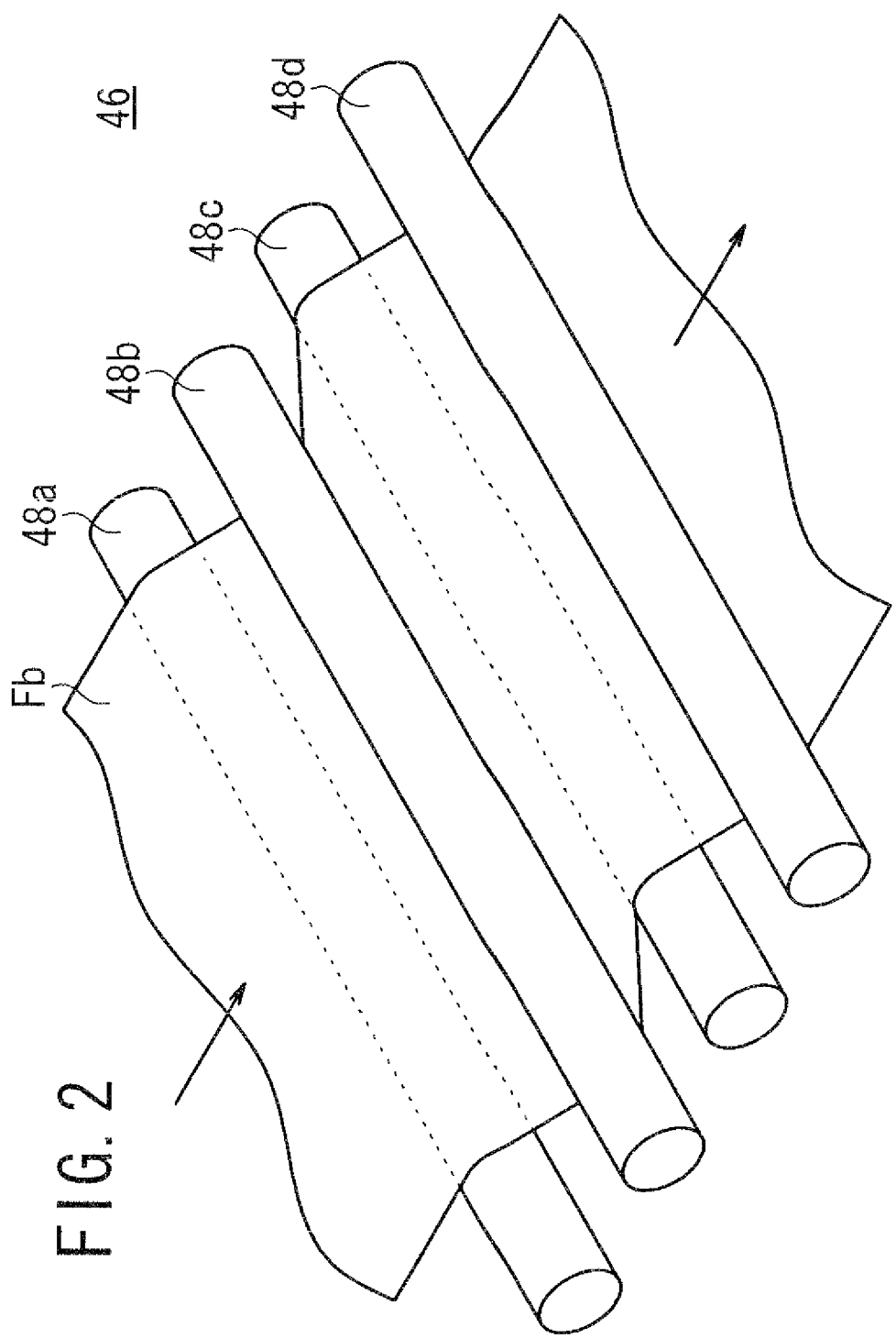

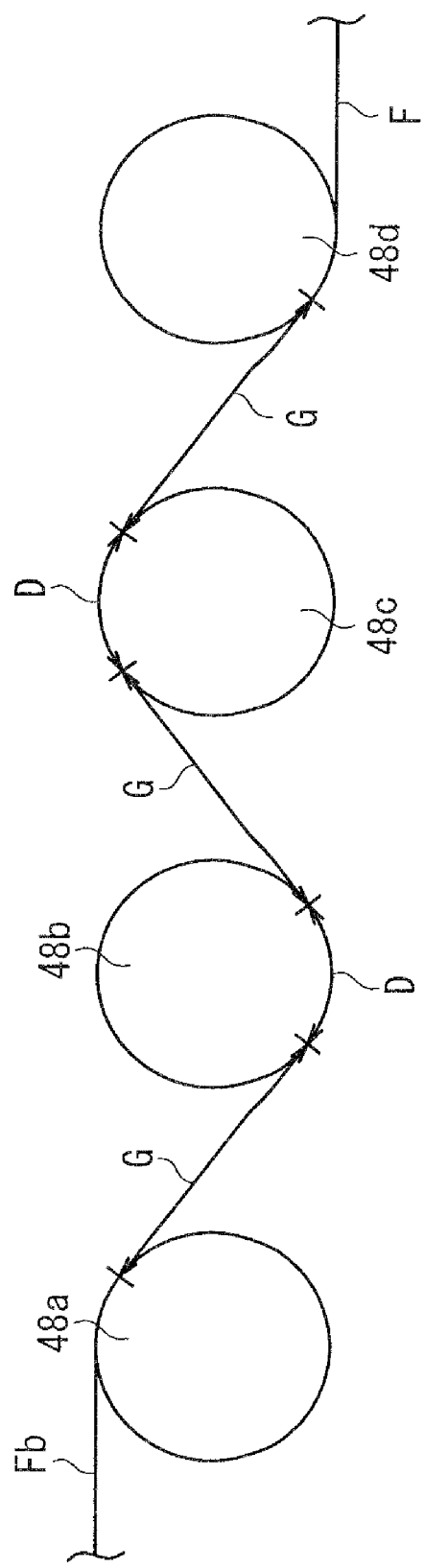

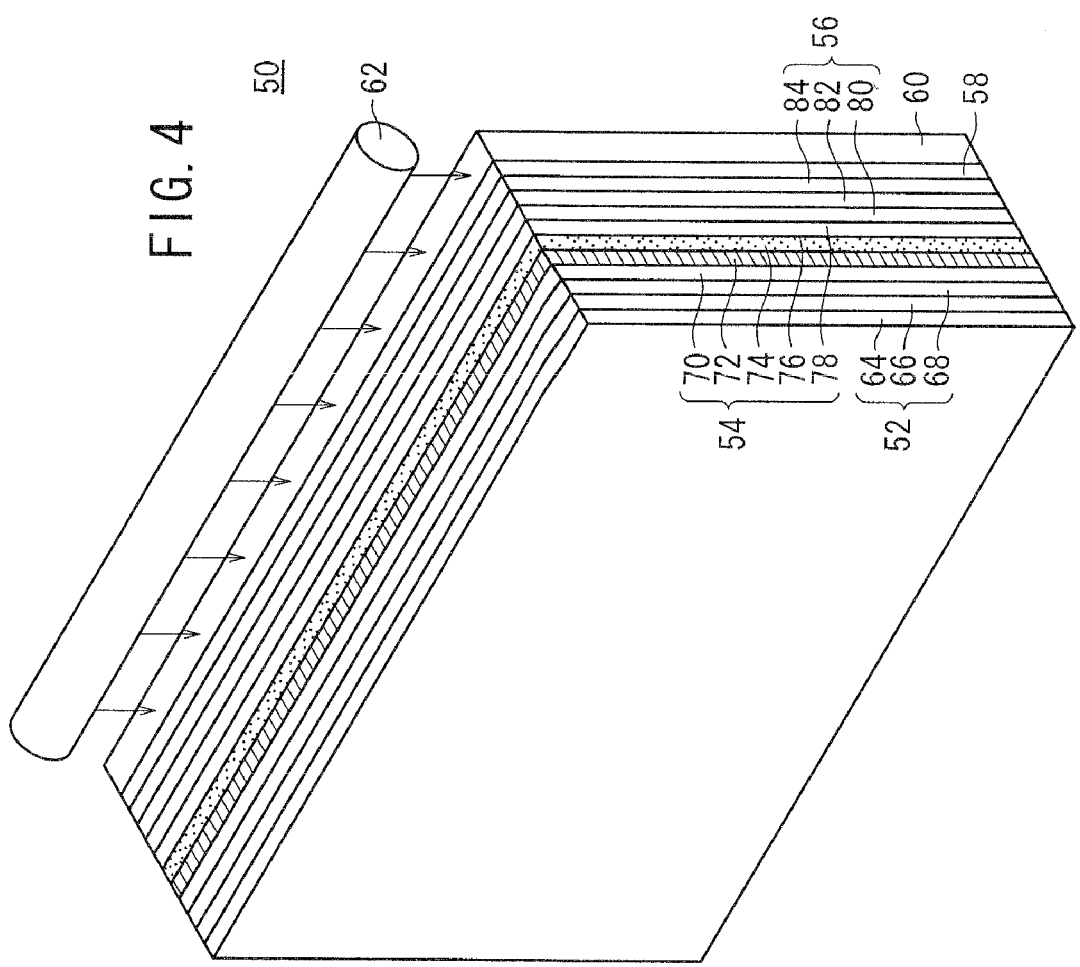

HEAT TREATMENT OF THERMOPLASTIC FILM, AND THERMOPLASTIC FILM AND METHOD FOR PRODUCING THE SAME

BACKGROUND OF THE INVENTION

1. Field of the Invention

The present invention relates to a method for heat-treating a thermoplastic film useful for a polarizing plate, an optical compensatory film for a liquid crystal display panel, an antireflection film, a liquid crystal display device, etc., and to a thermoplastic film and a method for producing the same.

2. Description of the Related Art

For the purpose increasing the viewing angle of a liquid crystal display device, a thermoplastic film is stretched to generate an in-plane retardation and a thickness direction retardation, and used as a phase difference film for the device. Particularly in recent years, a phase difference film capable of achieving a high contrast in a liquid crystal display device has been required to apply TN display mode to televisions.

Stretched thermoplastic films have been known as the phase difference film. The thermoplastic film can be stretched by using a longitudinal stretching method for stretching in the longitudinal (length) direction, a transverse stretching method for stretching in the transverse (width) direction, a successive biaxial stretching method for stretching in the longitudinal and transverse directions successively, or a simultaneous biaxial stretching method for stretching in the longitudinal and transverse directions simultaneously. However, these methods are disadvantageous in that, for example, the resultant stretched film cannot achieve the high contrast in a liquid crystal display device, or the method is poor in productivity. A method for producing a phase difference film, using uniaxial stretching, is described in Japanese Laid-Open Patent Publication No. 2001-305342. However, this method is extremely poor in productivity because the phase difference film produced by the method has a slow axis along the longitudinal direction, and thereby cannot be attached to a polarizer or a polarizing plate in a roll-to-roll manner. A film having an NZ value of 0.90 to 1.20 and a slow axis along the transverse direction is proposed in Japanese Laid-Open Patent Publication No. 2007-108529. Further, a film having an NZ value of 0.9 to 1.1, obtained by carrying out transverse stretching and longitudinal relaxation simultaneously, is described in Japanese Laid-Open Patent Publication No. 2006-133720. However, in the case of using these films, as the screen size of the liquid crystal display device is increased, the contrast difference (contrast unevenness) between the center and edge of the screen is increased by a thermotreatment, and also light leakage is increased.

SUMMARY OF THE INVENTION

To solve the above conventional problems, an object of the present invention is to provide a heat treatment method capable of forming a thermoplastic film usable in a large-screen liquid crystal display device without light leakage and contrast unevenness over the entire screen, and a thermoplastic film and a method for producing the same.

The object of the present invention is achieved by the following aspects.

[1] A method for heat-treating a thermoplastic film according to the present invention, comprising, after transversely stretching a thermoplastic film, transporting the thermoplastic film in a heat-treating zone using two or more transporting rolls, wherein the ratio (G/D) of an inter-roll distance (G) to a roll lap length (D) is 0.01 to 3, and the ratio (V2/V1) of an exit-side transporting speed (V2) to an entry-side transporting speed (V1) is 0.6 to 0.999.

[2] A method according to [1], wherein the ratio (G/D) of the inter-roll distance (G) to the roll lap length (D) is 0.05 to 0.9.

[3] A method according to [1] or [2], wherein both ends of the thermoplastic film are fixed on the transporting rolls.

[4] A method according to any one of [1] to [3], wherein the thermoplastic film is heat-treated at (Tg−20)° C. to (Tg+50)° C., in which Tg is the glass transition temperature of the thermoplastic film.

[5] A method according to any one of [1] to [4], wherein the stretching magnification of the transverse stretching is 1.1 to 3 times.

[6] A method according to any one of [1] to [5], wherein the thermoplastic film comprises a cellulose acylate, a cycloolefin, a lactone ring-containing polymer, or a polycarbonate.

[7] A method according to any one of [1] to [6], wherein the thermoplastic film is formed by a melt film forming method.

[8] A method according to any one of [1] to [7], wherein the thermoplastic film has a surface roughness (Ra) of 0.005 to 0.04 μm.

[9] A method according to any one of [1] to [8], wherein the thermoplastic film is formed by a touch roll film forming method.

[10] A method according to any one of [1] to [9], wherein the thermoplastic film has an in-plate retardation (Re) of 50 to 150 nm (more preferably 70 to 95 nm) after the heat treatment.

[11] A thermoplastic film according to the present invention, exhibiting a ratio (Rth/Re) of a thickness direction retardation (Rth) to the Re of at least 0.5 and less than 1, an Rth/Re ratio range of 0.01 to 0.1 in the width direction, and a thermal dimensional change of 0.001% to 0.3% in a treatment at 80° C. for 200 hours.

[12] A thermoplastic film according to the present invention, obtained by a heat treatment method according to any one of [1] to [10].

[13] A polarizing plate, an optical compensatory film for a liquid crystal display panel, an antireflection film, and a liquid crystal display device according to the present invention, comprising a thermoplastic film according to the present invention.

[14] A method for producing a thermoplastic film according to the present invention, comprising, after transversely stretching a thermoplastic film, transporting the thermoplastic film in a heat-treating zone using two or more transporting rolls, wherein the ratio (G/D) of an inter-roll distance (G) to a roll lap length (D) is 0.01 to 3, and the ratio (V2/V1) of an exit-side transporting speed (V2) to an entry-side transporting speed (V1) is 0.6 to 0.999.

As described above, the thermoplastic film of the present invention can be used in a large-screen liquid crystal display device with reduced light leakage and contrast unevenness over the entire screen.

Further, the thermoplastic film having the above advantages can be efficiently produced by the production method or the heat treatment method of the present invention.

Furthermore, the polarizing plate, the optical compensatory film, the antireflection film, and the liquid crystal display device of the present invention have excellent optical properties.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic structural view showing a film producing apparatus for producing a thermoplastic film according to an embodiment of the present invention;

FIG. 2 is a perspective view showing a plurality of rolls arranged in a heat-treating zone;

FIG. 3 is an explanatory view showing a roll lap length (D) and an inter-roll distance (G) of the rolls in the heat-treating zone; and FIG. 4 is a schematic structural view showing a liquid crystal display device using the thermoplastic film according to the embodiment.

DESCRIPTION OF THE PREFERRED EMBODIMENTS

The thermoplastic film of the present invention, and the production and use thereof will be described in detail below. A typical embodiment of each component of the present invention will be described below without intention of restricting the scope of the invention. It should be noted that, in the present invention, a numeric range of "A to B" includes both the numeric values A and B as the lower limit and upper limit values.

An apparatus for producing the thermoplastic film, according to an embodiment of the present invention (hereinafter referred to as a film producing apparatus 10) will be described with reference to FIGS. 1 to 4 prior to explaining the thermoplastic film.

The film producing apparatus 10 shown in FIG. 1 is capable of producing a thermoplastic film F useful for a liquid crystal display device, etc. A pellet of a material for the thermoplastic film F, such as a cellulose acylate resin, a cycloolefin resin, a polycarbonate resin, or a lactone ring-containing polymer resin, is introduced to a dryer 12, and dried therein. The dried pellet is extruded by an extruder 14, and transported to a filter 18 by a gear pump 16. A contaminant in the pellet is removed by filtration with the filter 18, and a resin melt of the thermoplastic resin is extruded from a die 20. Then, the resin melt is press-formed between a first casting roll 28 and a touch roll 24, and cooled and solidified on the first casting roll 28 to prepare a film-shaped melt having a predetermined surface roughness. The film-shaped melt is transported by a second casting roll 26 and a third casting roll 27, to obtain an unstretched film Fa. The unstretched film Fa may be then wound and removed. Alternatively, the unstretched film Fa may be successively introduced to a transverse stretching portion 42 for long-span stretching. Even in a case where the unstretched film Fa is once wound and removed, and then introduced to the transverse stretching portion 42, the advantageous effects of the present invention are achieved.

In the transverse stretching portion 42, as shown in FIG. 1, the unstretched film Fa is stretched in the width direction perpendicular to the transporting direction to prepare a transversely stretched film Fb. A preheating portion 36 and a heat-fixing portion 44 may be disposed upstream and downstream of the transverse stretching portion 42 respectively to reduce bowing (misalignment of the optic axes) in the stretching process. The preheating temperature is preferably higher than the transverse stretching temperature, and the heat-fixing temperature is preferably lower than the transverse stretching temperature. The bowing is generally such that the width direction center of the film is concave forward in the transporting direction. When the above temperatures satisfy the conditions of [preheating temperature>stretching temperature] and [stretching temperature>afterheating temperature], the bowing can be reduced. One or both of the preheating and afterheating treatments may be carried out.

After the transverse stretching, the transversely stretched film Fb is heat-treated and shrunk in the longitudinal direction in a heat-treating zone 46. As shown in FIG. 2, the side edges of the film Fb are not fixed by a chuck, and the transversely stretched film Fb is transported by a plurality of rolls 48a to 48d such that the transversely stretched film Fb is shrunk not in the TD (transverse direction) but in the MD (longitudinal direction). As shown in FIG. 3, the rolls 48a to 48d are arranged such that the ratio (G/D) of the inter-roll distance (G) to the roll lap length (D) is 0.01 to 3. As a result, transverse shrinkage of the transversely stretched film Fb is prevented due to the friction between the film and the rolls. The transversely stretched film Fb is transported in the heat-treating zone 46 at a transporting speed (V1) of the entry-side roll 48a and at a transporting speed (V2) of the exit-side roll 48d such that the ratio (V2/V1) of the exit-side transporting speed (V2) to the entry-side transporting speed (V1) is 0.6 to 0.999. Thus, the transversely stretched film Fb is longitudinally shrunk in the heat-treating zone 46.

The transversely stretched film Fb is heat-treated in the heat-treating zone, so that a thermoplastic film F having controlled orientation angle and retardations is produced as a final product. The film F is wound in a winding portion 49.

A longitudinal stretching process may be carried out before or after the transverse stretching process. The film may be longitudinally stretched such that the film is transported between a pair of nip rolls, the transporting speed of the exit-side nip roll being higher than that of the entry-side nip roll. A longitudinal stretching method may be selected depending on the ratio (L/W) of the distance L between the nip rolls to the film width W at the entry-side nip roll. When the L/W ratio is small, a longitudinal stretching method described in Japanese Laid-Open Patent Publication Nos. 2005-330411 and 2006-348114, etc. may be used. In this method, the size of a stretching machine can be reduced though the Rth of the film is often increased excessively. On the other hand, when the L/W ratio is large, a longitudinal stretching method described in Japanese Laid-Open Patent Publication No. 2005-301225, etc. may be used. In this method, the Rth of the film can be reduced though the size of a stretching machine is often increased.

FIG. 4 is a schematic structural view showing a liquid crystal display device 50 using the thermoplastic film F produced in the above manner.

In the liquid crystal display device 50, a polarizing plate 52, a liquid crystal cell 54, and a polarizing plate 56 are stacked in this order, and a light guide plate 60 is attached to the polarizing plate 56 with a diffuser plate 58 disposed therebetween. An illumination light is introduced from a backlight 62 into the light guide plate 60.

The polarizing plate 52 is formed by sandwiching a polarizer 66 between an antireflection film 64 and an optical compensatory film 68. The liquid crystal cell 54 is formed such that a color filter 72 having R, G, and B pixels is attached to a glass substrate 70, and a liquid crystal layer 74, a TFT layer 76, and a glass substrate 78 are formed thereon in this order. The polarizing plate 56 is formed by sandwiching a polarizer 82 between an optical compensatory film 80 and a protective film 84.

In this embodiment, the thermoplastic film F produced by the film producing apparatus 10 of FIG. 1 can be used as the antireflection film 64, the optical compensatory film 68, 80, or the protective film 84 in the liquid crystal display device 50.

<Characteristics of the Present Invention>

The thermoplastic film and the producing method of the present invention will be described in more detail below.

The inventor has found that contrast reduction is caused after a thermotreatment depending on an Rth/Re ratio and an Rth/Re ratio range. The present invention has been achieved based on these findings. The thermotreatment means a drying treatment at 80° C. for 200 hours.

The Rth/Re ratio of the thermoplastic film is preferably at least 0.5 and less than 1, more preferably 0.55 to 0.9, further preferably 0.6 to 0.8. When the Rth/Re ratio is outside of this range, the contrast is reduced after the thermotreatment.

In this specification, $Re(\lambda)$ and $Rth(\lambda)$ represent an in-plane retardation and a retardation in the thickness direction at a wavelength $\lambda$ nm, respectively. The $Re(\lambda)$ is measured by means of KOBRA 21ADH or WR manufactured by Oji Scientific Instruments, by applying a $\lambda$-nm wavelength light in the normal line direction of the film. The wavelength $\lambda$ nm may be selected by manually changing a wavelength selection filter, or by converting a measured value using a program, etc.

In a case where the film to be measured is a uniaxial or biaxial index ellipsoid, the $Rth(\lambda)$ is calculated in the following manner.

The $Rth(\lambda)$ is calculated by KOBRA 21ADH or WR based on six measured $Re(\lambda)$ values, an assumed value of the average refractive index, and an input film thickness. The retardation $Re(\lambda)$ values are measured such that a $\lambda$-nm wavelength light is applied to the film from six directions tilted at 0° to 50° with 10° interval from the film normal line, using an in-plane slow axis (detected by KOBRA 21ADH or WR) as a tilt axis (rotation axis). When the film has no slow axis, an optional in-plane direction is used as the rotation axis.

When a retardation value measured using the in-plane slow axis as the rotation axis is zero at a particular tilt angle to the normal line, the positive sign of a retardation value at a tilt angle larger than the particular tilt angle is converted to negative sign, and then the negative retardation value is used in the calculation by KOBRA 21ADH or WR.

The Rth may be calculated by the following equalities (1) and (2) based on an assumed value of the average refractive index, an input thickness, and two retardation values measured in two tilt directions, using the slow axis as the tilt axis (the rotation axis). When the film has no slow axis, an optional in-plane direction is used as the rotation axis.

retardation $Re(\lambda)$ values are measured such that a $\lambda$-nm wavelength light is applied to the film from eleven directions tilted at −50° to +50° with 10° interval to the film normal line, using an in-plane slow axis (detected by KOBRA 21ADH or WR) as a tilt axis (rotation axis).

In the above measurements, the assumed values of the average refractive indices may be those described in *Polymer Handbook* (JOHN WILEY & SONS, INC.) and catalogs of various optical films. Unknown average refractive indices may be obtained by measurement using an Abbe refractometer.

The average refractive indices of major optical film materials are as follows: cellulose acylate (1.48), cycloolefin polymer (1.52), polycarbonate (1.59), polymethyl methacrylate (1.49), polystyrene (1.59). The above values of nx, ny, and nz are calculated by KOBRA 21ADH or WR from the input assumed average refractive index and film thickness. NZ is calculated using NZ=0.5+(Rth/Re).

The Rth/Re ratio range of the thermoplastic film in the width direction is preferably 0.01 to 0.1, more preferably 0.01 to 0.09, further preferably 0.02 to 0.08. The film is divided into 20 equal parts in the width direction, the Rth/Re ratios of the 20 parts are measured, and the difference between the maximum value and the minimum value of the measured ratios is obtained as the Rth/Re ratio range. When the film has the preferred Rth/Re ratio range, the in-plane contrast unevenness can be reduced after the thermotreatment even in a large-screen display device.

When the Rth/Re ratio range is larger than 0.1, the in-plane contrast unevenness is increased after the thermotreatment. On the other hand, when the Rth/Re ratio range is smaller than 0.01, the longitudinal shrinkage to be hereinafter described has to be increased to obtain such a small Rth/Re ratio range, so that the film is corrugated in the width direction. When the corrugated structure is exposed in the thermotreatment, the contrast unevenness is increased.

Further, the inventor has found that light leakage is caused after the thermotreatment due to the dimensional change of the thermoplastic film. When the film is dimensionally changed by the thermotreatment, a stress is generated due to the dimensional difference between the film and a glass plate attached thereto in a liquid crystal display device. The stress causes a photoelastic change, resulting in the light leakage.

The thermal dimensional change of the thermoplastic film by the thermotreatment is 0.001% to 0.3%, more preferably $$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \qquad \text{Equality (1)}$$

In the equality (1), $Re(\theta)$ represents a retardation value in a direction tilted at an angle $\theta$ from the film normal line, nx represents an in-plane refractive index in the slow axis direction, ny represents an in-plane refractive index in a direction perpendicular to the slow axis direction, nz represents a refractive index in a direction perpendicular to both the directions, and d represents a film thickness.

$$Rth=((nx+ny)/2-nz)\times d \qquad \text{Equality (2)}$$

In a case where the film to be measured is not a uniaxial or biaxial index ellipsoid, and thus has no so-called optic axes, the $Rth(\lambda)$ may be calculated in the following manner.

The $Rth(\lambda)$ is calculated by KOBRA 21ADH or WR based on eleven measured $Re(\lambda)$ values, an assumed value of the average refractive index, and an input film thickness. The 0.003% to 0.25%, further preferably 0.005% to 0.2%. When the thermal dimensional change is outside the range, the light leakage is increased. Even when the thermal dimensional change is smaller than the range, the glass plate is dimensionally changed, whereby the dimensional difference is caused between the film and the glass plate.

For achieving such properties of the thermoplastic film, it is important to heat-treat the film using the heat treatment method of the present invention. Thus, after the film is stretched in the transverse direction (TD), the film is heat-treated while being transported in the heat-treating zone such that the ratio (G/D) of the inter-roll distance (G) to the roll lap length (D) is 0.01 to 3, and the ratio (V2/V1) of the exit-side transporting speed (V2) to the entry-side transporting speed (V1) is 0.6 to 0.999.

A tenter may be used in transverse stretching to produce a uniform optical film. When a film is transversely stretched, generally the thickness of the film is reduced based on the material balance, and neck-in is caused in the direction (MD) perpendicular to the stretching direction. However, in the case of using the tenter, a transporting tension is applied to the film in the MD, so that the neck-in is hardly caused, and the thickness is more greatly reduced. Thus, the film is shrunk in the thickness direction, whereby the plane orientation is accelerated, and the Rth is more greatly increased than the Re.

Therefore, the Rth is larger than the Re immediately after the tenter stretching. Only the Rth can be reduced by shrinking the film in the MD, while the Re is not reduced. When the film is shrunk in both the MD and TD, the Re and the Rth are both reduced, and the Rth is larger than the Re. In contrast, when the film is shrunk only in the MD, the in-plane orientation (the Re) is not changed, and only the Rth is reduced depending on the increase in the thickness. As a result, the Rth can be smaller than the Re.

In Japanese Laid-Open Patent Publication Nos. 2007-108529 and 2006-133720, after a film is transversely stretched by using a simultaneous biaxial stretching machine, the film is shrunk in the longitudinal direction (MD) by reducing the transporting speed of a clip in a tenter, to reduce the Rth. The stretching and the longitudinal shrinkage described in Japanese Laid-Open Patent Publication Nos. 2007-108529 and 2006-133720 are carried out in the tenter successively or simultaneously, and thus the film is fixed by clips in both processes. However, in this method, to shrink the film in the MD, it is necessary to transversely stretch the film while maintaining a gap between adjacent clips. As a result, because portions fixed by the clips and portions not fixed by the clips are not stretched in the same way, the Rth/Re ratio range is often increased. Further, also the in-plane unevenness of the thermal dimensional change is often increased. The contrast unevenness and light leakage are disadvantageously caused due to the thermal dimensional change unevenness. The thermal dimensional change unevenness is obtained on percentage such that when the film is divided into five equal parts in the width direction, the thermal dimensional changes of the five parts are measured in both the MD and TD, and the difference between the maximum value and the minimum value of the measured 10 values is divided by the average value. The thermal dimensional change unevenness is preferably 10% or less, more preferably 7% or less, further preferably 5% or less.

Further, in the above method, the portions not fixed by the clips and portions between a pair of clips arranged in the width direction are nonuniformly shrunk. The portions not fixed by the clips can be shrunk not only in the MD but also in the TD, while the portions between the clips cannot be shrunk in the TD at all. A residual strain in the TD is often generated by the stretching, and the film is thermally shrunk in the TD due to the strain in the thermotreatment. In the thermal shrinkage, the film is expanded in the MD based on the material balance. The light leakage is caused due to such dimensional changes. Thus, when the film is longitudinally shrunk simultaneously in the tenter using the clips, the residual strain is often caused in the film, and the Rth/Re ratio range, the thermal dimensional change, and the thermal dimensional change unevenness are likely to be increased due to the strain released after the thermotreatment.

In contrast, in the present invention, the thermoplastic film is not shrunk in the tenter. The film is longitudinally shrunk after it is transversely stretched and taken out from the tenter (removed from a chuck). Both ends of the film are not fixed by a chuck in the shrinkage process, whereby the film can be longitudinally shrunk uniformly over the entire width. Thus, the increase in the Rth/Re ratio range and the thermal dimensional change unevenness can be prevented.

In the present invention, it is important to shrink the thermoplastic film not in the TD but in the MD (longitudinal direction) without using a chuck. The film is transported through a plurality of rolls arranged in the heat-treating zone while lapping the film over the rolls, to shrink the film only in the MD not in the TD. The shrinkage in the TD can be reduced due to the friction between the roll and the film. In this process, the film can be shrunk only in the MD such that the entry-side transporting speed (V1) is higher than the exit-side transporting speed, and the V2/V1 ratio is 0.6 to 0.999, preferably 0.65 to 0.99, more preferably 0.65 to 0.95, further preferably 0.7 to 0.85. When the V2/V1 ratio is larger than this range, the film cannot be longitudinally shrunk, and the Rth/Re ratio is disadvantageously larger than the above range according to the present invention. When the V2/V1 ratio is smaller than this range, the film is slipped on and scratched by the rolls. The V2/V1 ratio within the above range can be obtained when the transporting speed of the entry-side roll is higher than that of the exit-side roll.

To obtain a frictional force required for preventing the shrinkage of the film in the TD, the ratio (G/D) of a distance (G) between the rolls to a length (D) of a film portion lapped over the roll is preferably 0.01 to 3, more preferably 0.03 to 1, further preferably 0.05 to 0.5. When the ratio (G/D) is larger than this range, the distance between the rolls is too large, the frictional force is reduced, the film is shrunk also in the TD, the Re is reduced, and the Rth/Re ratio is disadvantageously larger than the above range according to the present invention. Further, also the Rth/Re ratio range and the thermal shrinkage unevenness are disadvantageously increased. When the distance between the rolls is too large, the both ends of the film are shrunk more than the center, whereby the Rth/Re ratio range and the thermal shrinkage unevenness are increased. This is because the center of the film is restrained by the both ends, while each of the ends is restrained only by the center, and whereby each of the ends is longitudinally shrunk easily.

On the other hand, when the ratio (G/D) is smaller than this range, the film is not shrunk in the TD at all, and a residual strain is often generated in the film. As a result, the film is thermally shrunk in the TD and expanded in the MD, and the thermal dimensional change is disadvantageously larger than the above range according to the present invention. Thus, when the film is shrunk in the longitudinal direction, and further is slightly shrunk also in the transverse direction (TD), the thermal dimensional change and the unevenness thereof can be reduced. As described above, the thermal dimensional change causes the light leakage. Further, when the ratio (G/D) is smaller than the above range, the Rth/Re ratio range is disadvantageously increased. This is because the distance for longitudinally shrinking the film is not sufficient, so that the film cannot be longitudinally shrunk uniformly, and the Re and the Rth are made uneven.

To obtain a sufficient frictional force between the roll and the thermoplastic film, the surface roughness (Ra) of the thermoplastic film is preferably 0.005 to 0.04 µm, more preferably 0.007 to 0.035 µm, further preferably 0.009 to 0.030 µm. When the surface roughness is larger than this range, the sufficient frictional force cannot be obtained, and the Rth/Re ratio is disadvantageously larger than the above range according to the present invention. On the other hand, when the surface roughness is smaller than this range, the film is ground and scratched by the roll, and the film is hardly relaxed in the TD, whereby the thermal dimensional change is increased, resulting in the light leakage. The surface roughness of the thermoplastic film is a value measured after the stretching and longitudinal shrinkage processes. In general, the frictional force depends on the surface roughness in the longitudinal shrinkage process. Because the surface roughness is not changed by the longitudinal shrinkage process, the value measured after the longitudinal shrinkage process is used as the surface roughness.

The film having such a surface can be formed by a touch roll film forming method to be hereinafter described. In this method, a cast film is sandwiched between smooth-surface rolls immediately after casting, to prepare a smoother film with the above surface roughness.

The number of the rolls for the longitudinal shrinkage is preferably 2 to 100, more preferably 3 to 50, further preferably 4 to 20. The diameter of the roll is preferably to 100 cm, more preferably 10 to 80 cm, further preferably 15 to 60 cm.

In the present invention, both ends of the thermoplastic film are preferably fixed on the rolls. The term "both ends of the thermoplastic film are fixed" means that the dimensional change of the film in the width direction is 10% or less. The both ends of the film may be fixed by applying an electrostatic force to the both ends or entire width of the roll, or by drawing the film using a suction drum disposed on the both ends or entire surface of the roll. Further, the film may be fixed by a nip roll disposed on the end or entire width of the roll. The number of the nip rolls is preferably 1 to 20, more preferably 2 to 10, per one roll. Further, it is also preferred that an expander roll is used as the roll. These methods may be used singly or in combination.

The longitudinal shrinkage temperature is preferably (Tg−20)° C. to (Tg+50)° C., more preferably (Tg−10)° C. to (Tg+40)° C., further preferably (Tg−5)° C. to (Tg+35)° C., in which Tg is the glass transition temperature of the thermoplastic film. When the longitudinal shrinkage temperature is higher than this range, the Re is reduced, and the Rth/Re ratio is more than 1 in some cases. On the other hand, when the longitudinal shrinkage temperature is lower than this range, both the Rth and the Re are not reduced, and the Rth/Re ratio is larger than the above range according to the present invention. Further, because the residual strain generated in the stretching process cannot be sufficiently eliminated, the thermal dimensional change is increased, and thereby the light leakage is increased.

In the longitudinal shrinkage process, the thermoplastic film may be heated by circulating a heating medium in the roll for transporting the film, or by disposing a heat source (such as an IR heater or a halogen heater) over the thermoplastic film, or by introducing a temperature controlling air into the heat-treating zone.

The shrinkage time is preferably 1 second to 10 minutes, more preferably 5 seconds to 8 minutes, further preferably 10 seconds to 5 minutes, though not restrictive.

The Re of thus obtained thermoplastic film is preferably 20 to 300 nm, more preferably 30 to 280 nm, further preferably 40 to 250 nm, particularly preferably 50 to 150 nm, most preferably 70 to 95 nm.

The thermoplastic film heat-treated according to the present invention may have optical properties within a range defined by the following two equations:

$$Rth = (-3/8)Re + 80$$

$$Rth = (-3/8)Re + 100$$

wherein the Re is −10 to 150 nm, particularly preferably 50 to 150 nm, most preferably 70 to 95 nm.

The present invention will be described in more detail below.

(1) Material of Thermoplastic Film

The material of the thermoplastic film of the present invention is not particularly limited, and preferred examples thereof include cellulose acylates, lactone ring-containing polymers, cyclic olefins, and polycarbonates. Among the materials, more preferred are cellulose acylates and cyclic olefins, further preferred are cellulose acylates having an acetate or propionate group and cyclic olefins prepared by addition polymerization, and still further preferred are cyclic olefins prepared by addition polymerization.

(a) Cellulose Acylate

Cellulose acylates described in Japanese Laid-Open Patent Publication Nos. 2001-188128, 2006-142800, and 2007-98917, etc. may be used in the present invention. The total acyl substitution degree of the cellulose acylate is preferably 2.1 to 3.0, and the acetyl substitution degree of the cellulose acylate is preferably 0.05 to 2.5, more preferably 0.05 to 0.5 or 1.5 to 2.5. The propionyl substitution degree of the cellulose acylate is preferably 0.1 to 2.8, more preferably 0.1 to 1.2 or 2.3 to 2.8.

(b) Cyclic Olefin

The cyclic olefin is preferably a polymer of a norbornene compound. The norbornene compound may be ring-opening-polymerized or addition-polymerized. Examples of methods for the addition polymerization include those described in Japanese Patent Nos. 3517471, 3559360, 3867178, 3871721, 3907908, and 3945598, Japanese Laid-Open Patent Publication No. 2005-527696 (PCT), Japanese Laid-Open Patent Publication No. 2006-28993, and WO 2006/004376. The method described in Japanese Patent No. 3517471 is particularly preferred.

Examples of methods for the ring-opening polymerization include those described in WO 98/14499, and Japanese Patent Nos. 3060532, 3220478, 3273046, 3404027, 3428176, 3687231, 3873934, and 3912159. The methods described in WO 98/14499 and Japanese Patent No. 3060532 are particularly preferred.

It is more preferred that the cyclic olefin is prepared by addition polymerization.

(c) Lactone Ring-Containing Polymer

The lactone ring-containing polymer may have a lactone ring structure represented by the following general formula (1).

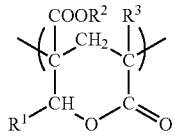

(1)

In the general formula (1), $R^1$, $R^2$, and $R^3$ independently represent a hydrogen atom or an organic group having 1 to 20 carbon atoms. The organic group may contain an oxygen atom.

In the lactone ring-containing polymer, the ratio of the lactone ring structure represented by the general formula (1) is preferably 5% to 90% by weight, more preferably 10% to 70% by weight, further preferably 10% to 50% by weight.

The lactone ring-containing polymer preferably has, in addition to the lactone ring structure represented by the general formula (1), a repeating unit derived from at least one monomer selected from the group consisting of (meth)acrylate esters, hydroxyl-containing monomers, unsaturated carboxylic acids, and monomers represented by the following general formula (2a).

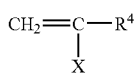

(2a)

In the general formula (2a), $R^4$ represents a hydrogen atom or a methyl group, and X represents a hydrogen atom, an alkyl group having 1 to 20 carbon atoms, an aryl group, an —OAc group, a —CN group, a —CO—$R^5$ group, or a —C—O—$R^6$ group. Ac represents an acetyl group, and $R^5$ and $R^6$ each represent a hydrogen atom or an organic group having 1 to 20 carbon atoms.

Examples of the lactone ring-containing polymers include those described in WO 2006/025445, and Japanese Laid-Open Patent Publication Nos. 2007-70607, 2007-63541, 2006-171464, and 2005-162835.

(d) Polycarbonate Resin

The polycarbonate is prepared by interfacial polymerization or melt polymerization of a dihydroxy component and a carbonate precursor. Preferred examples of the polycarbonates include those described in Japanese Laid-Open Patent Publication Nos. 2006-277914, 2006-106386, and 2006-284703.

(e) Additive

The thermoplastic film may contain 0% to 20% by mass of a plasticizer, and examples thereof include alkyl phthalyl alkyl glycolates, phosphate esters, carboxylate esters, and polyalcohols. The thermoplastic film may contain 0% to 3% by mass of a stabilizer, and examples thereof include phosphate stabilizers (such as tris(4-methoxy-3,5-diphenyl) phosphite, tris(nonylphenyl) phosphate, and tris(2,4-di-t-butylphenyl) phosphite), phenol stabilizers (such as 2,6-di-t-butyl-4-methylphenol, 2,2-methylene bis(4-ethyl-6-t-butylphenol), 2,5-di-t-butylhydroquinone, pentaerythrityl tetrakis[3-(3,5-di-t-butyl-4-hydroxyphenyl)propionate], 4,4-thio-bis-(6-t-butyl-3-methylphenol), 1,1'-bis(4-hydroxyphenyl)cyclohexane, and octadecyl-3-(3,5-di-t-butyl-4-hydroxyphenyl)propionate), epoxy compounds, and thioether compounds. Further, the thermoplastic film may contain 0 to 1000 ppm of a matting agent, and examples thereof include fine particles of inorganic substances such as silica, titania, zirconia, alumina, calcium carbonate, and clay, and fine particles of organic substances such as crosslinked acryls and crosslinked styrenes. It is also preferred that an ultraviolet absorber (such as 2,4-dihydroxybenzophenone, 2-hydroxy-4-methoxybenzophenone, or 2,2-methylene bis[4-(1,1,3,3-tetramethylbutyl)-6-[(2H-benzotriazole-2-yl)phenol]]), an infrared absorber, or a retardation modifier is added to the thermoplastic film.

(2) Formation of Thermoplastic Film

The film of the present invention may be formed by a melt film forming method or a solution-cast film forming method, and is preferably formed by the melt film forming method.

(a) Melt Film Forming Method i) Preparation of Pellet

The above described thermoplastic resin and the additive are preferably mixed to prepare a pellet before the melt film forming.

The pellet may be prepared such that the thermoplastic resin and the additive are dried and then melted at 150° C. to 300° C. using a biaxial kneading extruder, the mixture melt is extruded into a noodle shape and solidified in air or water, and the solidified mixture is cut. The pellet may be prepared by an underwater cutting method, wherein the mixture melt is cut while extruding the melt from a die opening directly into water.

An extruder such as a single screw extruder, a non-intermeshed counter-rotation twin screw extruder, an intermeshed counter-rotation twin screw extruder, or an intermeshed co-rotation twin screw extruder may be used. The rotation rate of the extruder is preferably 10 to 1000 rpm, more preferably 20 to 700 rpm. The extrusion residence time is preferably 10 seconds to 10 minutes, more preferably 20 seconds to 5 minutes.

The size of the pellet is preferably 10 to 1000 $mm^3$, more preferably 30 to 500 $mm^3$.

ii) Melt Kneading

It is preferred that the water content of the pellet is reduced before the melt film forming. The drying temperature is preferably 40° C. to 200° C., more preferably 60° C. to 150° C. The water content of the dried pellet is preferably 1.0% by mass or less, more preferably 0.1% by mass or less.

The dried pellet is introduced from a feed opening of the extruder into a cylinder, and is kneaded and melted. The cylinder contains a feed section (area A), a compression section (area B), and a measurement section (area C) disposed in this order from the feed opening. The screw compression ratio of the extruder is preferably 1.5 to 4.5, the ratio (L/D) of the cylinder length to the cylinder inner diameter is preferably 20 to 70, and the inner diameter of the cylinder is preferably 30 to 150 mm. The extrusion temperature is preferably 190° C. to 300° C. Further, it is preferred that an inert gas (such as nitrogen) is flown in the extruder, or the extruder is vacuated through a vent, to prevent the oxidation of the melted resin due to residual oxygen.

iii) Filtration

A filtration device containing a breaker plate or a leaf disc filter is preferably used to remove a contaminant in the resin. The filtration may be carried out by using a single- or multi-stage filtration process. The filtration accuracy is preferably 15 to 3 μm, more preferably 10 to 3 μm. The filter material is preferably composed of a stainless steel. The filter material may be a woven wire material or a burned metal powder material, and is preferably the burned metal powder material.

iv) Gear Pump

A gear pump is preferably disposed between the extruder and a die for reducing the change of discharge rate and improving the thickness accuracy. By using the gear pump, the resin pressure fluctuation in the die can be reduced to ±1% or less.

The pressure in the upstream of the gear pump may be controlled uniformly by changing the rotation rate of the screw, to improve the constant supply property of the gear pump.

v) Die

The resin melted in the above extruder is transported through the filtration device and the gear pump if necessary, and is successively introduced to a die. The die may be a T die, a fishtail die, or a coat-hanger die. A static mixer is preferably disposed upstream of the die to make the resin temperature uniform. The ratio of the exit clearance of the T die to the film thickness is generally 1.0 to 10, preferably 1.2 to 5.

It is preferred that the thickness of the exit clearance of the die can be controlled at 5 to 50 mm intervals. The die may be an automatic thickness controlling die. In this case, the thickness and the thickness deviation of the film in the downstream of the die are calculated, and the results are fed back to the die. The film may be formed by using a single layer film forming apparatus or a multilayer film forming apparatus.

The residence time of the resin in the feed opening, the extruder, and the die is preferably 3 to 40 minutes, more preferably 4 to 30 minutes.

vi) Casting

The melted resin (the melt) is extruded from the die into a sheet shape, and is cooled and solidified on a casting drum, to produce the film.

It is preferred that an air flow is blocked between the die and the casting drum to suppress the influence of the air flow.

The adhesion between the casting drum and the melt is preferably improved by an electrostatic method, an air knife method, an air chamber method, a vacuum nozzle method, a touch roll method, etc. Among the methods, the touch roll method is particularly preferred. The melt may be partly or entirely subjected to such an adhesion improving method.

In the touch roll method, a touch roll is disposed on the casting drum to modify the surface of the film. It is preferred that the touch roll is not a general rigid roll, but an elastic roll. In the case of using the elastic roll, an excess pressure is not applied to the film, and the surface roughness of the film can be prevented from being reduced below the range according to the present invention. In this case, the touch roll has an outer cylinder thickness smaller than normal, and the thickness Z of the outer cylinder is preferably 0.05 to 7.0 mm, more preferably 0.2 to 5.0 mm, further preferably 0.3 to 3.5 mm. The touch roll may be disposed on a metal shaft, and a heating medium (a fluid) may be circulated therebetween. Further, an elastic layer may be formed between the outer cylinder and the metal shaft, and a heating medium (a fluid) fills the space between the outer cylinder and the elastic layer. The pressure applied by the touch roll is preferably low to reduce the Rth. However, when the pressure is too low, the surface roughness according to the present invention cannot be obtained. On the other hand, the pressure is too high, the Rth is increased though the surface roughness is reduced. Thus, the surface pressure applied by the touch roll is preferably 0.1 to 5 MPa, more preferably 0.2 to 3 MPa, further preferably 0.3 to 2 MPa. The surface pressure means a value obtained by dividing the force to pressing the touch roll by the contact area between the thermoplastic film and the touch roll.

The temperature of the touch roll is preferably 60° C. to 160° C., more preferably 70° C. to 150° C., further preferably 80° C. to 140° C. The temperature can be controlled by flowing a liquid or a gas with a controlled temperature in the roll. The touch roll more preferably has such a temperature controlling mechanism inside.

The material of the touch roll is preferably a metal, more preferably a stainless steel. Further, the touch roll preferably has a plated surface. When the touch roll is composed of a rubber or a metal lined with a rubber, the rubber has an excessively large surface roughness, whereby the thermoplastic film having the above surface roughness cannot be formed.

The arithmetic average height Ra of each of the touch roll and the casting roll is 100 nm or less, preferably 50 nm or less, further preferably 25 nm or less.

Examples of the touch rolls include those described in Japanese Laid-Open Patent Publication Nos. 11-314263, 2002-36332, and 11-235747, WO 97/28950, and Japanese Laid-Open Patent Publication Nos. 2004-216717 and 2003-145609.

It is more preferred that the film is gradually cooled by using a plurality of the casting drums (rolls). In this case, the touch roll is disposed so as to touch the most upstream casting roll closest to the die. Three cooling rolls are relatively commonly used, though not restrictive. The diameter of the roll is preferably 100 to 1500 mm, more preferably 150 to 1000 mm. The distance between the surfaces of the plurality of rolls is preferably 0.3 to 300 mm, more preferably 1 to 100 mm, further preferably 3 to 30 mm. The temperature of the casting drum is preferably 60° C. to 160° C., more preferably 70° C. to 150° C., further preferably 80° C. to 140° C.

Then, the film is peeled from the casting drum, transported through a nip roll, and wound. The speed of the winding is preferably 10 to 100 m/minute, more preferably 15 to 80 m/minute, further preferably 20 to 70 m/minute.

The width of the formed film is preferably 0.7 to 3 m, more preferably 1 to 2 m. The thickness of the formed, unstretched film is preferably 40 to 300 μm, more preferably 60 to 250 μm, further preferably 80 to 200 μm.

vii) Trimming, Thickening, and Winding

It is also preferred that both ends of the formed cast film are trimmed. Cut pieces generated by the trimming may be ground and reused as a starting material.

It is also preferred that one end or both ends of the film are subjected to a thickening treatment (a knurling treatment). The height of a knurl formed by the thickening treatment is preferably 1 to 50 μm, more preferably 3 to 20 μm. In the thickening treatment, a protrusion may be formed on one surface or both surfaces. The width of the knurl is preferably 1 to 50 mm, more preferably 3 to 30 mm. The extrusion may be carried out at room temperature to 300° C.

It is also preferred that a lamifilm is attached to one surface or both surfaces of the film before winding The thickness of the lamifilm is preferably 5 to 100 μm, more preferably 10 to 50 μm. The material of the lamifilm is not particularly limited, and may be a polyethylene, a polyester, a polypropylene, etc.

The tension for winding the film is preferably 2 to 50 kg/m-width, more preferably 5 to 30 kg/m-width.

(Solution-Cast Film Forming)

i) Dissolution

In the solution-cast film forming method, a high-concentration solution (a dope) of the thermoplastic resin is prepared using a solvent selected depending on the type of the resin. A dichloromethane-type solvent is preferably used for the cellulose acylate and the polycarbonate, and examples thereof include those described in Japanese Laid-Open Patent Publication No. 2001-188128, Paragraph [0044]. A dichloromethane- or hydrocarbon-type solvent (such as toluene, xylene, benzene, or cyclohexane) may be used for the cycloolefin, and examples thereof include those described in Japanese Laid-Open Patent Publication No 2007-108529, Paragraph [0180].

The thermoplastic resin concentration of the dope is preferably 5% to 40% by mass, more preferably 10% to 30% by mass. It is preferred that the above described additive is dissolved together with the thermoplastic resin.

A cooling/heating method may be used for dissolving the thermoplastic resin. Examples of the cooling/heating methods include those described in Japanese Laid-Open Patent Publication Nos. 11-323017, 10-67860, 10-95854, 10-324774, and 11-302388.

ii) Solution-Cast Film Forming

The prepared dope is stored once, and then defoamed. The defoamed dope is transported to a pressurizing-type die by a high-accuracy pump (such as a pressurizing-type constant rate gear pump), and is uniformly cast from a die opening (a slit) onto an endless casting support (such as a band or a drum). The dope may be cast into a single layer or two or more layers. When the support is rotated approximately one revolution, a film of the dope (a web) that is not fully dried is peeled at the peeling point. The temperature of the support (the band or drum) is preferably controlled at −30° C. to 30° C. Both ends of the peeled web are clipped, and the web is transported by a tenter while maintaining the width, and thereby is dried. Then, the web is transported and dried by rolls of a dryer, and is trimmed, knurled (embossed), and wound into a predetermined length by a winder.

The width of the formed film is preferably 0.7 to 3 m, more preferably 1 to 2 m. The thickness of the formed, unstretched film is preferably 40 to 300 µm, more preferably 60 to 250 µm, further preferably 80 to 200 µm.

Methods described in Kokai Giho (JIII Journal of Technical Disclosure), No. 2001-1745, published on Mar. 15, 2001, Japan Institute of Invention and Innovation may be used as the solution-cast film forming method.

[Stretching]

The thermoplastic film obtained by the melt film forming method or the solution-cast film forming method is transversely stretched. The stretching magnification of the transverse stretching is preferably 1.1 to 3 times, more preferably 1.2 to 2.5 times, further preferably 1.3 to 2.3 times. The stretching magnification means a value obtained by dividing the film length after the stretching by the film length before the stretching.

The stretching temperature is preferably $(Tg-10)°$ C. to $(Tg+50)°$ C., more preferably $(Tg-5)°$ C. to $(Tg+40)°$ C., further preferably Tg to $(Tg+30)°$ C.

It is also preferred that the film is longitudinally stretched before and/or after the transverse stretching. The longitudinal stretching temperature is preferably $(Tg-10)°$ C. to $(Tg+40)°$ C., more preferably Tg to $(Tg+20)°$ C. The stretching magnification of the longitudinal stretching is preferably 1.05 to 2.5 times, more preferably 1.1 to 1.8 times. The stretching magnification of the longitudinal stretching is preferably smaller than that of the transverse stretching, and is more preferably 0.8 times or less that of the transverse stretching.

In the stretching processes, the residual solvent content of the film has to be 0.1% by mass or less. When the residual solvent content is too high, the solvent is nonuniformly volatilized from the film surface, and the Rth/Re ratio range (unevenness) is increased.

The thickness of the stretched film is preferably 20 to 150 µm, more preferably 30 to 120 µm, further preferably 40 to 100 µm.

[Longitudinal Shrinkage]

The stretched film is longitudinally shrunk as described above. The shrinkage may be carried out online successively after the stretching, and may be carried out after winding the stretched film.

[Modification of Film]

The thermoplastic film of the present invention may be used singly or in combination with a polarizing plate. A liquid crystal layer, a layer with a controlled refractive index (such as a low-reflection layer), or a hard coat layer may be formed on the thermoplastic film. Thus, the thermoplastic film may be modified as follows.

(Surface Treatment)

(1) Cellulose Acylate Film

The thermoplastic film may be surface-treated to improve the adhesion to a functional layer such as an undercoat layer or a back layer. Examples of the surface treatments include glow discharge treatments, ultraviolet irradiation treatments, corona treatments, flame treatments, and acid or alkali saponification treatments. The glow discharge treatments include low-temperature plasma treatments under a low-pressure gas at $10^{-3}$ to 20 Torr (0.13 to 2700 Pa). Further, the glow discharge treatments include plasma treatments at atmosphere pressure.

Among the above treatments, the alkali saponification treatments are particularly preferred.

In the alkali saponification treatment, the thermoplastic film may be soaked in a saponification liquid (a dipping method), and may be coated with a saponification liquid (a coating method). In the dipping method, the film is soaked for 0.1 to 10 minutes in a bath containing an aqueous solution of NaOH, KOH, etc. having a pH of 10 to 14 and heated at 20° C. to 80° C., and then neutralized, water-washed, and dried.

Examples of the coating methods include dip coating methods, curtain coating methods, extrusion coating methods, bar coating methods, and E-coating methods. A solvent in a coating liquid for the alkali saponification treatment is preferably an alcohol-based solvent, particularly preferably isopropyl alcohol, in view of improving the wetting property. Further, an aqueous solution of a surfactant may be used as the solvent. An alkali in the coating liquid for the alkali saponification treatment may be KOH or NaOH. The pH of the coating liquid for the alkali saponification treatment is preferably 10 or more, more preferably 12 or more. The saponification time is preferably 5 seconds to 5 minutes, particularly preferably 20 seconds to 3 minutes, at room temperature. After the saponification reaction, the film is preferably water-washed. The saponification treatment using the coating method and the forming and coating of an oriented film to be hereinafter described may be carried out successively to reduce the number of steps. These saponification methods are described in Japanese Laid-Open Patent Publication No. 2002-82226, WO 02/46809, etc.

The undercoat layer is preferably formed to improve the adhesion between the thermoplastic film and the functional layer. This layer may be formed after the surface treatment, and may be formed without the surface treatment. The undercoat layer is described in detail in Kokai Giho (JIII Journal of Technical Disclosure), No. 2001-1745, published on Mar. 15, 2001, Japan Institute of Invention and Innovation, Page 32.

The steps of the surface treatment and the undercoating may be carried out as the final step of the film forming process, and may be carried out separately. Further, the steps may be carried out in the step of forming the functional layer to be hereinafter described.

(2) Thermoplastic Film of Material Other than Cellulose Acylate

Also in the case of using a material other than the cellulose acylate for the thermoplastic film, the film may be surface-treated. Examples of the surface treatments include glow discharge treatments, ultraviolet irradiation treatments, corona treatments, flame treatments, and acid or alkali treatments. The glow discharge treatments include low-temperature plasma treatments under a low-pressure gas at $10^{-3}$ to 20 Torr (0.13 to 2700 Pa). Further, the glow discharge treatments include plasma treatments at atmosphere pressure.

Among the above treatments, preferred are the glow discharge treatments, the corona treatments, and the flame treatments, and more preferred are the corona treatment.

The undercoat layer is preferably formed to improve the adhesion between the thermoplastic film and the functional layer. This layer may be formed after the surface treatment, and may be formed without the surface treatment. The undercoat layer is described in detail in Kokai Giho (JIII Journal of Technical Disclosure), No. 2001-1745, published on Mar. 15, 2001, Japan Institute of Invention and Innovation, Page 32.

The steps of the surface treatment and the undercoating may be carried out as the final step of the film forming process, and may be carried out separately. Further, the steps may be carried out in the step of forming the functional layer to be hereinafter described.

(Formation of Functional Layer)

The thermoplastic film of the present invention is preferably used in combination with the functional layer, which is described in detail in Kokai Giho (JIII Journal of Technical Disclosure), No. 2001-1745, published on Mar. 15, 2001, Japan Institute of Invention and Innovation, Page 32 to 45. The thermoplastic film is particularly preferably used in combination with a polarizing layer (a polarizing plate), an optically anisotropic layer (an optical compensatory layer), or an antireflection layer (an antireflection film).

<Optically Anisotropic Layer>

The optically anisotropic layer is preferably designed for compensating a liquid crystal compound in a liquid crystal cell at the time of black level of a liquid crystal display device. The orientation of the liquid crystal compound in the liquid crystal cell at the black level is different depending on the mode of the liquid crystal display device. The orientation state of the liquid crystal compound in the liquid crystal cell is described in IDW'00, FMC7-2, Page 411 to 414, etc.

The optically anisotropic layer may be formed on a support from a liquid crystal compound. An oriented film may be disposed between the optically anisotropic layer and the support. The oriented film preferably has a thickness of 10 μm or less.

The liquid crystal compound used in the optically anisotropic layer may be a rod-like liquid crystal compound or a discotic liquid crystal compound. The rod-like or discotic liquid crystal compound may be a high- or low-molecular compound, and may be a low-molecular liquid crystal compound that is crosslinked and loses the liquid crystallinity. The optically anisotropic layer may be formed by applying a coating liquid containing the liquid crystal compound to the oriented film, and the coating liquid may further contain a polymerization initiator or another component if necessary. Preferred examples of the oriented films used in the present invention are described in Japanese Laid-Open Patent Publication No. 8-338913.

(Rod-Like Liquid Crystal Compound)

Preferred examples of the rod-like liquid crystal compounds include azomethine compounds, azoxy compounds, cyanobiphenyl compounds, cyanophenyl esters, benzoate esters, phenyl cyclohexanecarboxylate compounds, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds.

The rod-like liquid crystal compounds include metal complexes and liquid crystal polymers having a repeating unit containing the rod-like liquid crystal compound. Thus, the rod-like liquid crystal compound may be bonded to a (liquid crystal) polymer.

Specific examples of the rod-like liquid crystal compounds are described in Kikan Kagaku Sosetsu (Quarterly Chemical Review), No. 22, Ekisho no Kagaku (Chemistry of Liquid Crystals), 1994, edited by The Chemical Society of Japan, Section 4, 7, and 11, Liquid Crystal Device Handbook, edited by Committee 142 of The Japan Society for the Promotion of Science, Section 3, etc.

The rod-like liquid crystal compound preferably has a birefringence of 0.001 to 0.7.

The rod-like liquid crystal compound preferably has a polymerizable group to fix the orientation state. The polymerizable group is preferably an unsaturated polymerizable group or an epoxy group, more preferably an unsaturated polymerizable group, most preferably an unsaturated ethylenic polymerizable group.

(Discotic Liquid Crystal Compound)

Example of the discotic liquid crystal compounds include benzene derivatives described in C. Destrade, et al., Mol. Cryst., Vol. 71, Page 111 (1981), truxene derivatives described in C. Destrade, et al., Mol. Cryst. Vol. 122, Page 141 (1985) and Physics Lett., A, Vol. 78, Page 82 (1990), cyclohexane derivatives described in B. Kohne, et al., Angew. Chem., Vol. 96, Page 70 (1984), and azacrown- or phenylacetylene-based macrocycles described in J. M. Lehn, et al., J. C. S. Chem. Commun., Page 1794 (1985) and J. Zhang, et al., J. Am. Chem. Soc., Vol. 116, Page 2655 (1994).

The discotic liquid crystal compound may have a structure containing a molecular center core and a radial side chain of a straight alkyl group, an alkoxy group, or a substituted benzoyloxy group. It is preferred that the discotic liquid crystal compound exhibits a rotation symmetry property in the form of a molecule or a molecular assembly, and can be in a certain orientation state. Even when the optically anisotropic layer is formed from the discotic liquid crystal compound, the compound may be present in this layer in the original state or another state. For example, the low-molecular discotic liquid crystal compound may have a heat- or light-responsive group, and the compound may be polymerized or crosslinked by heat or light to lose the liquid crystallinity in the layer. Preferred examples of the discotic liquid crystal compounds are described in Japanese Laid-Open Patent Publication No. 8-50206. Further, the polymerization of the discotic liquid crystal compound is described in Japanese Laid-Open Patent Publication No. 8-27284.

To fix the discotic liquid crystal compound by polymerization, a polymerizable group is bonded as a substituent to the discotic core of the discotic liquid crystal compound. In a case where the polymerizable group is directly bonded to the discotic core, it is difficult to maintain the orientation state in the polymerization. Thus, a linking group is introduced between the discotic core and the polymerizable group. The discotic liquid crystal compound having the polymerizable group is preferably represented by the following general formula (5).

$$D(-LQ)_r \qquad \text{General formula (5)}$$

In the general formula (5), D represents a discotic core, L represents a divalent linking group, Q represents a polymerizable group, and r represents an integer of 4 to 12.

Examples of the discotic core (D) are illustrated below. In the following examples, LQ (or QL) represents a combination of the divalent linking group (L) and the polymerizable group (Q).

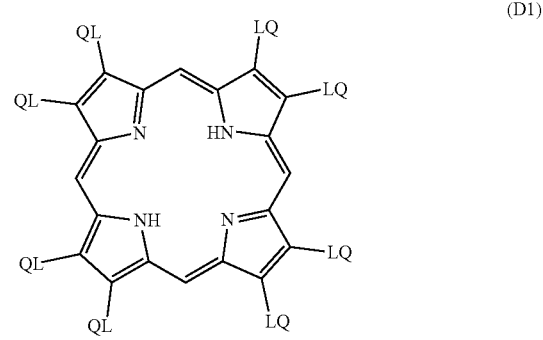

(D1)

-continued
(D2)
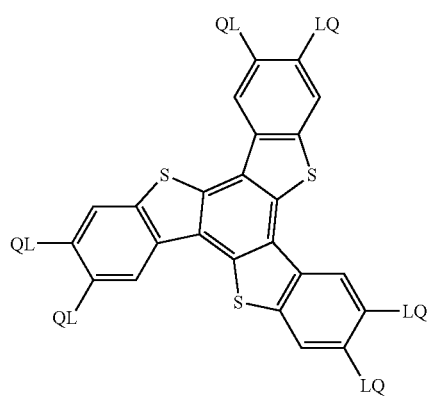
(D3)
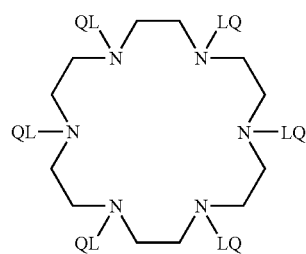
(D4)
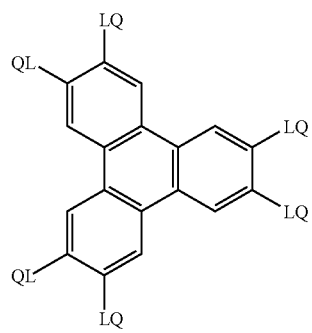
(D5)
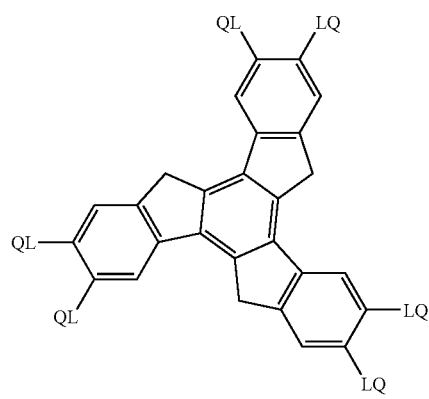
-continued
(D6)
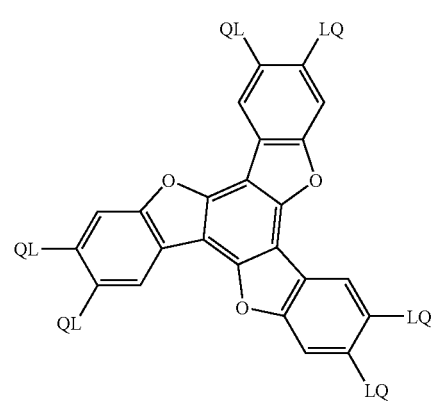
(D7)
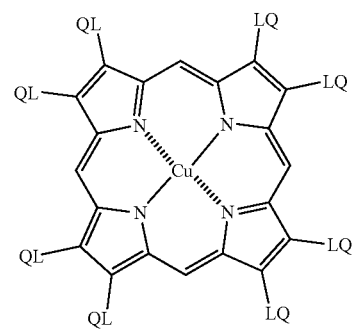
(D8)
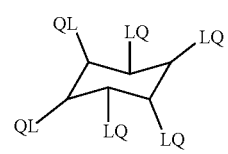
(D9)
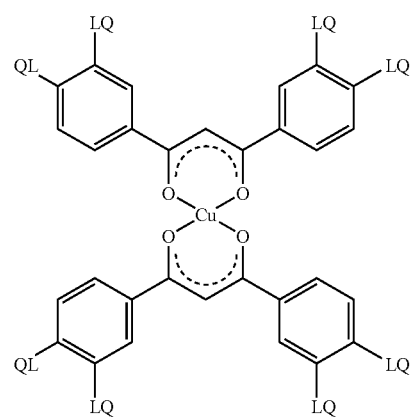
(D10)
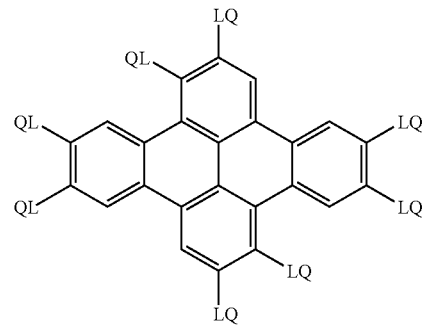

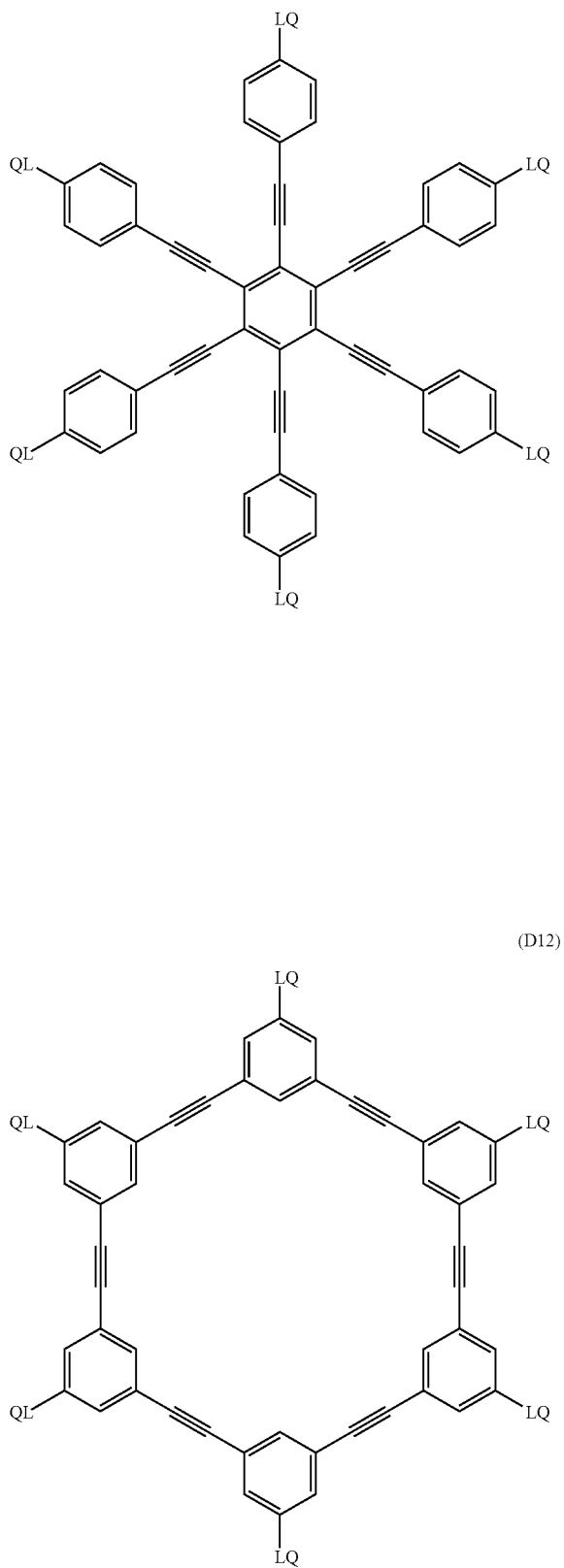
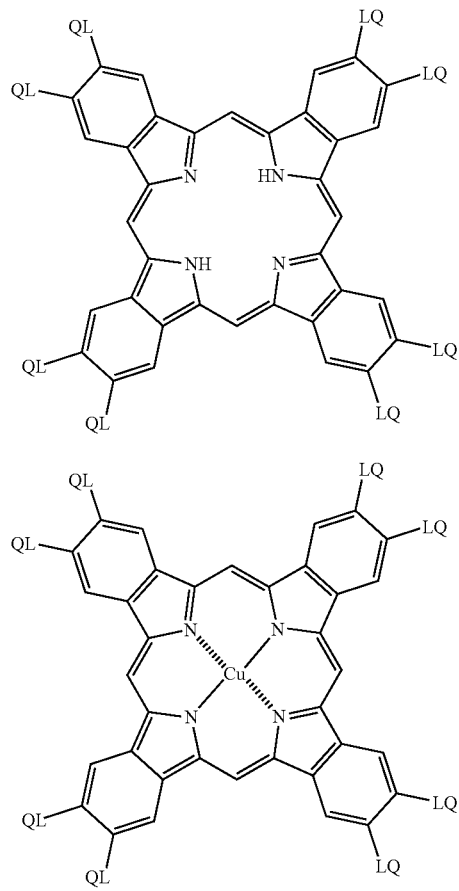
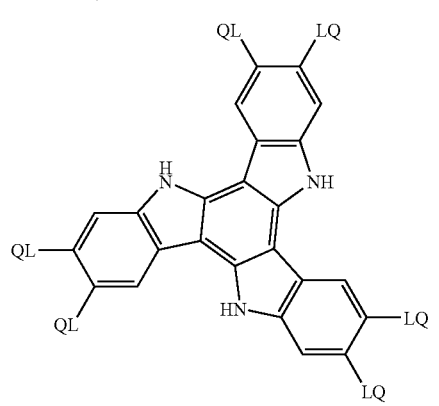

In the general formula (5), the divalent linking group (L) is preferably selected from the group consisting of alkylene groups, alkenylene groups, arylene groups, —CO—, —NH—, —O—, —S—, and combinations thereof. The divalent linking group (L) is further preferably a combination of at least two groups selected from the group consisting of alkylene groups, arylene groups, —CO—, —NH—, —O—, and —S—. The divalent linking group (L) is most preferably a combination of at least two groups selected from the group consisting of alkylene groups, arylene groups, —CO—, and —O—. The alkylene group preferably has 1 to 12 carbon atoms, the alkenylene group preferably has 2 to 12 carbon atoms, and the arylene group preferably has 6 to 10 carbon atoms.

Examples of the divalent linking group (L) are illustrated below. In the following examples, the left is bonded to the discotic core (D), and the right is bonded to the polymerizable group (Q). AL represents an alkylene or alkenylene group, and AR represents an arylene group. The alkylene, alkenylene, and arylene groups may have a substituent such as an alkyl group.

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: -G-AL-O—CO—
L14: —O-AL-O—CO—NH-AL-
L15: —O-AL-S-AL-
L16: —O—CO-AL-AR-O-AL-O—CO—
L17: —O—CO-AR-O-AL-CO—
L18: —O—CO-AR-O-AL-O—CO—
L19: —O—CO-AR-O-AL-O-AL-O—CO—
L20: —O—CO-AR-O-AL-O-AL-O-AL-O—CO—
L21: —S-AL-
L22: —S-AL-O—
L23: —S-AL-O—CO—
L24: —S-AL-S-AL-
L25: —S-AR-AL-

In the general formula (5), the polymerizable group (Q) may be selected depending on the type of the polymerization. Examples of the polymerizable group (Q) are illustrated below.

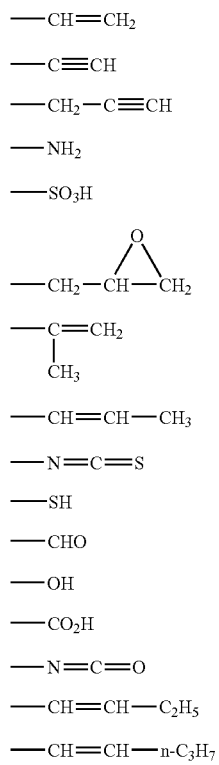

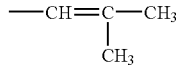

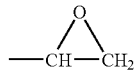

The polymerizable group (Q) is preferably an unsaturated polymerizable group (such as Q1, Q2, Q3, Q7, Q8, Q15, Q16, or Q17) or an epoxy group (such as Q6 or Q18), more preferably an unsaturated polymerizable group, most preferably an unsaturated ethylenic polymerizable group (such as Q1, Q7, Q8, Q15, Q16, or Q17). The value of r depends on the type of the discotic core (D). In the discotic liquid crystal compound, a plurality of combinations of L and Q may be the same or different, and are preferably the same.

In a hybrid orientation, the tilt angles of the major axes (the discotic planes) of the discotic liquid crystal compound molecules against the support surface are in the depth direction of the optically anisotropic layer (i.e., the direction perpendicular to the transparent support), and increase or decrease as the distance from the polarizing film increases. The tilt angles preferably increase as the distance increases. The variation of the tilt angle may be continuous increase, continuous decrease, intermittent increase, intermittent decrease, combination of continuous increase and continuous decrease, or intermittent variation of increase and decrease. In the intermittent variation, the tilt angles do not vary in a particular area in the middle of the thickness direction of the layer. The layer may contain such a particular area with constant tilt angle as long as the tilt angles increase or decrease as a whole. It is preferred that the tilt angles vary continuously.

In general, the average direction of the major axes (the discotic planes) of the liquid crystal discotic compound molecules can be controlled by selecting the discotic liquid crystal compound, the material of the oriented film, or a rubbing treatment method. Further, the directions of the major axes (the discotic planes) of the discotic liquid crystal compound on the front side (near the air) can be controlled by selecting the discotic liquid crystal compound or an additive used in combination therewith.

Examples of the additives for use in combination with the discotic liquid crystal compound include plasticizers, surfactants, polymerizable monomers, and polymers. Also the degree of orientation direction variation of the major axes can be controlled by selecting the discotic liquid crystal compound and the additive.

It is preferred that the additive such as the plasticizer, the surfactant, or the polymerizable monomer for use in combination with the discotic liquid crystal compound has compatibility to the discotic liquid crystal compound, and can change the tilt angle of the compound, or does not inhibit the orientation of the compound. The polymerizable monomers are preferred among the above additives, and examples thereof include compounds having a vinyl, vinyloxy, acryloyl, or methacryloyl group. The mass ratio of the polymerizable monomer to the discotic liquid crystal compound is generally 1% to 50% by mass, preferably 5% to 30% by mass. A monomer having four or more polymerizable functional groups may be mixed to improve the adhesion between the oriented film and the optically anisotropic layer.

The optically anisotropic layer may contain a polymer in addition to the discotic liquid crystal compound. It is preferred that the polymer has a certain compatibility to the discotic liquid crystal compound, and can change the tilt angle of the compound. The polymer may be a cellulose ester. Preferred examples of the cellulose esters include cellulose acetates, cellulose acetate propionates, hydroxypropylcelluloses, and cellulose acetate butyrates. The mass ratio of the polymer to the discotic liquid crystal compound is preferably 0.1% to 10% by mass, more preferably 0.1% to 8% by mass, further preferably 0.1% to 5% by mass, so as not to inhibit the orientation of the discotic liquid crystal compound.

The phase transition temperature of the discotic liquid crystal compound between the discotic nematic liquid crystalline phase and the solid phase is preferably 70° C. to 300° C., more preferably 70° C. to 170° C.

(Fixation of Orientation State of Liquid Crystal Molecules)

The oriented liquid crystal molecules may be fixed while maintaining the orientation state. The fixation is preferably achieved by polymerization. The polymerization may be thermal polymerization using a thermal polymerization initiator or photopolymerization using a photopolymerization initiator, and is preferably photopolymerization.

Examples of the photopolymerization initiators include α-carbonyl compounds described in U.S. Pat. Nos. 2,367,661 and 2,367,670; acyloin ethers described in U.S. Pat. No. 2,448,828; α-hydrocarbon-substituted, aromatic acyloin compounds described in U.S. Pat. No. 2,722,512; polynuclear quinone compounds described in U.S. Pat. Nos. 3,046,127 and 2,951,758; combinations of triarylimidazole dimers and p-aminophenyl ketone described in U.S. Pat. No. 3,549,367; acridine compounds and phenazine compounds described in Japanese Laid-Open Patent Publication No. 60-105667 and U.S. Pat. No. 4,239,850; and oxadiazole compounds described in U.S. Pat. No. 4,212,970.

The mass ratio of the photopolymerization initiator to the solid content of the coating liquid is preferably 0.01% to 20% by mass, more preferably 0.5% to 5% by mass.

In the photopolymerization, the liquid crystal molecules are preferably irradiated with an ultraviolet ray.

The irradiation energy is preferably 20 mJ/cm$^2$ to 50 J/cm$^2$, more preferably 20 to 5000 mJ/cm$^2$, further preferably 100 to 800 mJ/cm$^2$. The irradiation may be carried out under heating to accelerate the photopolymerization.

A protective layer may be formed on the optically anisotropic layer.

The optically anisotropic layer may be formed by the steps of coating liquid containing at least one of the above liquid crystal compounds, applying the coating liquid to the oriented film surface, and drying the applied liquid. The coating liquid may contain an additive such as the polymerization initiator or a fluorine-containing polymer if desired.

The fluorine-containing compound may be a known compound. Specific examples of the fluorine-containing compounds include those described in Japanese Laid-Open Patent Publication No. 2001-330725, Paragraphs [0028] to [0056].

A solvent for the coating liquid is preferably an organic solvent. Examples of the organic solvents include amides such as N,N-dimethylformamide; sulfoxides such as dimethylsulfoxide; heterocyclic compounds such as pyridine; hydrocarbons such as benzene and hexane; alkyl halides such as chloroform, dichloromethane, and tetrachloroethane; esters such as methyl acetate and butyl acetate; ketones such as acetone and methyl ethyl ketone; and ethers such as tetrahydrofuran and 1,2-dimethoxyethane. Preferred organic solvents include alkyl halides and ketones. Two or more organic solvents may be used in combination.

To produce a highly uniform optical compensatory film, the surface tension of the coating liquid is preferably 25 mN/m or less, more preferably 22 mN/m or less.

The coating liquid may be applied by a known method such as an extrusion coating method, a direct gravure coating method, a reverse gravure coating method, or a die coating method.

[Polarizing Plate]

(Polarizing Film)

The polarizing plate of the present invention preferably has a coating-type polarizing film such as a product available from Optiva Inc., or a polarizing film containing iodine or a dichroic dye together with a binder.

The iodine or the dichroic dye is oriented in the binder to exhibit a polarizing property. It is preferred that the iodine or the dichroic dye is oriented along the binder molecules. Further, it is also preferred that the dichroic dye is self-assembled like liquid crystal compounds and oriented in one direction.

For example, a common polarizer may be produced by soaking a stretched polymer in a solution of the iodine or the dichroic dye in a bath, thereby penetrating the iodine or the dichroic dye into the binder.

In a common polarizing film, the iodine or the dichroic dye is distributed in a region within a distance of about 4 μm (about 8 μm in total of both sides) from the polymer surface. Thus, the thickness of the polarizing film has to be 10 μm or more to obtain a sufficient polarizing performance. The penetration can be controlled by selecting the concentration of the iodine or the dichroic dye, the bath temperature, or the soaking time.

The lower limit of the binder thickness is preferably 10 μm, as described above. The upper limit of the thickness is not particularly restricted. It is preferred that the thickness is smaller from the viewpoint of the light leakage of the liquid crystal display device using the polarizing plate. The thickness of the polarizing film is preferably at most a common thickness (about 30 μm), more preferably 25 μm or less, further preferably 20 μm or less. When the thickness is 20 μm or less, the light leakage is not observed in a 17-inch liquid crystal display device.

The binder of the polarizing film may be crosslinked. A polymer that can be crosslinked per se may be used as the binder. The polarizing film may be formed such that a polymer having a functional group or a binder prepared by introducing a functional group to a polymer is crosslinked under a light, heat, or pH variation.

A crosslinking agent may be used to introduce a crosslinked structure to the polymer. Thus, by using a highly reactive crosslinking agent, a linking group may be introduced from the crosslinking agent to the binder, and the binder may be crosslinked to form the polarizing film.

The crosslinking is generally carried out such that a coating liquid containing a polymer or a mixture of a polymer and a crosslinking agent is applied to a transparent support, and the applied liquid is heated. The crosslinking may be carried out at any time in the production of the polarizing plate because only the final product needs to have a sufficient durability.

The binder of the polarizing film may be the polymer, which can be crosslinked per se or can be crosslinked by the crosslinking agent. Examples of the polymers include polymethyl methacrylates, polyacrylic acids, polymethacrylic acids, polystyrenes, gelatins, polyvinyl alcohols, modified polyvinyl alcohols, poly(N-methylolacrylamide)s, polyvinyltoluenes, chlorosulfonated polyethylenes, nitrocelluloses, chlorinated polyolefins such as polyvinylchlorides, polyesters, polyimides, polyvinyl acetates, polyethylenes, carboxymethylcelluloses, polypropylenes, polycarbonates, and copolymers thereof such as acrylic acid/methacrylic acid copolymers, styrene/maleinimide copolymers, styrene/vinyltoluene copolymers, vinyl acetate/vinyl chloride copolymers, and ethylene/vinyl acetate copolymers. Preferred as the polymer are water-soluble polymers such as poly(N-methylolacrylamide)s, carboxymethylcelluloses, gelatins, polyvinyl alcohols, and modified polyvinyl alcohols, more preferred are gelatins, polyvinyl alcohols, and modified polyvinyl alcohols, and the most preferred are polyvinyl alcohols and modified polyvinyl alcohols.

The saponification degree of the polyvinyl alcohol or modified polyvinyl alcohol is preferably 70% to 100%, more preferably 80% to 100%, most preferably 95% to 100%. The polymerization degree of the polyvinyl alcohol is preferably 100 to 5000.

The modified polyvinyl alcohol may be prepared by introducing a modification group to a polyvinyl alcohol by copolymerization modification, chain transfer modification, or block polymerization modification. Examples of the modification groups introduced by the copolymerization modification include —COONa, —Si(OH)$_3$, N(CH$_3$)$_3$.Cl, C$_9$H$_{19}$COO—, —SO$_3$Na, and —C$_{12}$H$_{25}$. Examples of the modification groups introduced by the chain transfer modification include —COONa, —SH, and —SC$_{12}$H$_{25}$. The polymerization degree of the modified polyvinyl alcohol is preferably 100 to 3000. The modified polyvinyl alcohol is described in Japanese Laid-Open Patent Publication Nos. 8-338913, 9-152509, and 9-316127.

The polymer is particularly preferably an unmodified polyvinyl alcohol or an alkylthio-modified polyvinyl alcohol with a saponification degree of 85% to 95%.

Two or more of the polyvinyl alcohols and modified polyvinyl alcohols may be used in combination.

The heat and humidity resistance of the polarizing film can be improved by adding a large amount of the crosslinking agent for the binder. However, when the mass ratio of the crosslinking agent to the binder is 50% by mass or more, the orientation of the iodine or the dichroic dye is deteriorated. The mass ratio of the crosslinking agent to the binder is preferably 0.1% to 20% by mass, more preferably 0.5% to 15% by mass.

After the crosslinking reaction, the binder contains a certain amount of unreacted crosslinking agent. The mass ratio of the residual crosslinking agent to the binder is preferably 1.0% by mass or less, more preferably 0.5% by mass or less. When the binder layer contains more than 1.0% by mass of the crosslinking agent, the durability may be deteriorated. Thus, in a case where the polarizing film having a high residual crosslinking agent content is incorporated in a liquid crystal display device, and used for a long period of time, or left under a high-temperature high-humidity environment for a long period of time, the polarization property of the polarizing film is often deteriorated.

The crosslinking agent is described in United States Reissue Patent No. 23297. Also a boron compound such as boric acid or borax may be used as the crosslinking agent.

Exampled of the dichroic dyes include azo dyes, stilbene dyes, pyrazolone dyes, triphenylmethane dyes, quinoline dyes, oxazine dyes, thiazine dyes, and anthraquinone dyes. The dichroic dye is preferably water-soluble, and preferably has a hydrophilic substituent such as a sulfo, amino, or hydroxyl group.

Examples of the dichroic dyes include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. The dichroic dye is described in Japanese Laid-Open Patent Publication Nos. 1-161202, 1-172906, 1-172907, 1-183602, 1-248105, 1-265205, and 7-261024. The dichroic dye is used in the form of a free acid or a salt such as an alkaline metal salt, an ammonium salt, or an amine salt. The polarizing film can be produced with various hues by combining two or more dichroic dyes. By using a compound (a dye) capable of showing a black color with polarizing axes intersected perpendicularly or by combining various dichroic dyes for showing a black color, the resulting polarizing film or plate can be excellent in single-plate transmittance and polarization rate.

It is preferred from the viewpoint of increasing the contrast ratio of the liquid crystal display device that the polarizing plate has a high transmittance and a high polarization degree. The transmittance of the polarizing plate at the wavelength of 550 nm is preferably 30% to 50%, more preferably 35% to 50%, most preferably 40% to 50%, the maximum single-plate transmittance of the polarizing plate being 50%. The polarization degree at the wavelength of 550 nm is preferably 90% to 100%, more preferably 95% to 100%, most preferably 99% to 100%.

An adhesive may be used for bonding the polarizing film and the optically anisotropic layer or bonding the polarizing film and the oriented film. Examples of the adhesives include polyvinyl alcohol resins (which may be modified with an acetoacetyl group, a sulfonic acid group, a carboxyl group, or an oxyalkylene group), and aqueous boron compound solutions. The adhesive is preferably a polyvinyl alcohol resin. The thickness of the adhesive layer is preferably 0.01 to 10 μm, particularly preferably 0.05 to 5 μm, after drying.

(Production of Polarizing Plate)

It is preferred from the viewpoint of yield that the polarizing film is colorized by the iodine or the dichroic dye after subjecting the film to a stretching or rubbing method. In the stretching method, the polarizing film is stretched such that the binder is inclined at a tilt angle of 10 to 80 degrees against the longitudinal direction (MD) of the polarizing film. The tilt angle preferably corresponds to the angle of the longitudinal or transverse direction of the liquid crystal cell of the LCD to the transmission axes of two polarizing plates attached to both sides thereof.

Generally the tilt angle is 45 degrees. However, transmission-, reflection-, and semi-transmission-type LCDs not using the tilt angle of 45 degrees have been developed recently, so that it is preferred that the stretching direction can be properly controlled depending on the LCD.

In the stretching method, the stretching magnification is preferably 2.5 to 30.0 times, more preferably 3.0 to 10.0 times. The film may be stretched by a dry stretching method in air or a wet stretching method in water. The stretching magnification is preferably 2.5 to 5.0 times in the dry stretching method, and it is preferably 3.0 to 10.0 times in the wet stretching method. The stretching including oblique stretching may be carried out several times so that the film can be stretched more uniformly even at a high stretching magnification. The film may be slightly stretched transversely or longitudinally before the oblique stretching, to prevent shrinkage in the width direction.

The term "stretching magnification" used herein means the ratio (L'/L) of a film length (L') after the stretching to a film length (L) before the stretching, measured by marking the film before the stretching.

The film may be biaxially stretched such that the left and the right are tentered in the different manners. The biaxial stretching may be the same as those used in common film forming methods. Since the binder film is stretched leftward and rightward at different rates in the biaxial stretching, the left and the right of the film need to have different thicknesses before the stretching. In a casting film forming method, binder solution flow rates to the left and the right can be differentiated by tapering a die.

The binder film may be stretched obliquely at a tilt angle of 10 to 80 degrees against the MD of the polarizing film as described above.

In the rubbing method, common rubbing treatments for orienting liquid crystals of LCDs may be used. Thus, the film surface may be rubbed with paper, gauze, felt, rubber, nylon, polyester fiber, etc. in a constant direction to obtain the orientation. Generally the film surface is rubbed several times with a cloth woven averagely from fibers with uniform length and width. A rubbing roll having 30 µm or less of circularity, cylindricity, and deflection (eccentricity) is preferably used in the rubbing method. The lap angle of the film to the rubbing roll is preferably 0.1 to 90 degrees. The film may be wound around the roll at 360 degrees or more to achieve a stable rubbing treatment as described in Japanese Laid-Open Patent Publication No. 8-160430.

In the case of rubbing a long film, the film is preferably transported at a rate of 1 to 100 m/min under a constant tension force by a transport apparatus. The rubbing roll is preferably rotatable in a direction parallel to the film transporting direction to control the rubbing angle. It is preferred that the rubbing angle is appropriately selected within the range of 0 to 60 degrees. In the case of using the film in the liquid crystal display device, the rubbing angle is preferably 40 to 50 degrees, particularly preferably 45 degrees.

[Liquid Crystal Display Device]

The optical compensatory film and the polarizing plate of the present invention can be used in liquid crystal display devices using various liquid crystal modes. A preferred embodiment of the optically anisotropic layer in each liquid crystal mode will be described below.

(TN Mode Liquid Crystal Display Device)

TN mode liquid crystal cells have been most widely used in color TFT liquid crystal display devices, and are described in many references.

In the TN mode liquid crystal cell, the orientation state is such that the rod-like liquid crystal molecules stand up in the center of the cell and lie down in the vicinity of a substrate at the time of black level.

The rod-like liquid crystal molecules in the center of the cell can be compensated by a (transparent) support or a discotic liquid crystal compound in the homeotropic orientation state (the discotic planes lying down horizontally), and the rod-like liquid crystal molecules in the vicinity of the substrate can be compensated by a discotic liquid crystal compound in the hybrid orientation state (the inclinations of the major axes varying with the distance from the polarizing film).

Further, the rod-like liquid crystal molecules in the center of the cell can be compensated by a (transparent) support or a rod-like liquid crystal compound in the homogeneous orientation state (the major axes lying down horizontally), and the rod-like liquid crystal molecules in the vicinity of the substrate can be compensated by a discotic liquid crystal compound in the hybrid orientation state.

In the homeotropic orientation state, the liquid crystal molecules are oriented such that the angle between the polarizing film surface and the average orientation direction of the major axes of the liquid crystal molecules is 85 to 95 degrees.

In the homogeneous orientation state, the liquid crystal molecules are oriented such that the angle between the polarizing film surface and the average orientation direction of the major axes of the molecules is less than 5 degrees.

In the hybrid orientation state, the angle between the polarizing film surface and the average orientation direction of the major axes of the liquid crystal molecules is preferably 15 degrees or more, more preferably 15 to 85 degrees.

The optically anisotropic layer containing the (transparent) support or the discotic liquid crystal compound in the homeotropic orientation state, the optically anisotropic layer containing the rod-like liquid crystal compound in the homogeneous orientation state, and the optically anisotropic layer containing a mixture of the discotic liquid crystal compound in the homeotropic orientation and the rod-like liquid crystal compound in the homogeneous orientation state preferably have a retardation Rth of 40 to 200 nm and a retardation Re of 0 to 70 nm.

The layers of the discotic liquid crystal compound in the homeotropic (horizontal) orientation state and the rod-like liquid crystal compound in the homogeneous (horizontal) orientation state are described in Japanese Laid-Open Patent Publication Nos. 12-304931 and 12-304932. The layer of the discotic liquid crystal compound in the hybrid orientation state is described in Japanese Laid-Open Patent Publication No. 8-50206.

(OCB Mode Liquid Crystal Display Device)

OCB mode liquid crystal cells are bend orientation mode cells containing rod-like liquid crystal molecules, and the molecules in an upper portion and the molecule in a lower portion are oriented in substantially opposite directions symmetrically. A liquid crystal display device using such a bend orientation mode liquid crystal cell is disclosed in U.S. Pat. Nos. 4,583,825 and 5,410,422. The bend orientation mode liquid crystal cell has a self-optical compensatory function because the rod-like liquid crystal molecules are symmetrically oriented. Thus, the liquid crystal mode is referred to also as an OCB (Optically Compensatory Bend) liquid crystal mode.

In the OCB mode liquid crystal cell, the orientation state is such that the rod-like liquid crystal molecules stand up in the center of the cell and lie down in the vicinity of a substrate at the time of black level, in the same manner as in the TN mode cells.

Since the orientation state of the OCB mode cell is the same as that of the TN mode cell at the black level, a preferred embodiment of the OCB mode cell is also the same as that of the TN mode cell. However, the center portion, in which the liquid crystal molecules stand up, in the OCB mode cell is larger than in the TN mode cell. Thus, in the case of using the discotic liquid crystal compound in the homeotropic orientation state or the rod-like liquid crystal compound in the homogeneous orientation state in the optically anisotropic layer, it is necessary to control the retardation. Specifically, the optically anisotropic layer containing the discotic liquid crystal compound in the homeotropic orientation state on the (transparent) support and the optically anisotropic layer containing the rod-like liquid crystal compound in the homogeneous orientation state preferably have a retardation Rth of 150 to 500 nm and a retardation Re of 20 to 70 nm.

(VA Mode Liquid Crystal Display Device)

In VA mode liquid crystal cells, the rod-like liquid crystal molecules are substantially vertically oriented under no voltage applied.

The VA mode liquid crystal cells include (1) narrowly-defined VA mode liquid crystal cells described in Japanese Laid-Open Patent Publication No. 2-176625, wherein the rod-like liquid crystal molecules being substantially vertically oriented under no voltage applied, and the molecules being substantially horizontally aligned under a voltage applied; (2) MVA mode liquid crystal cells described in SID97, Digest of tech. Papers (Yokosyu), 28 (1997), 845, wherein a multidomain structure being formed in the VA mode cell to increase the viewing angle; (3) n-ASM mode liquid crystal cells described in Nippon Ekisyo Toronkai Yokosyu, 58 to 59 (1998), wherein the rod-like liquid crystal molecules being substantially vertically oriented under no voltage applied, and the molecules being oriented in a twisted multidomain state under a voltage applied; and (4) SUR-VAIVAL mode liquid crystal cells announced in LCD International 98.

In the VA mode liquid crystal display device, most of the rod-like liquid crystal molecules in the liquid crystal cell stand up at the black level. Thus, it is preferred that the liquid crystal compound is compensated by the optically anisotropic layer containing the discotic liquid crystal compound in the homeotropic orientation state or the rod-like liquid crystal compound in the homogeneous orientation state, and further the viewing angle dependency of the polarizing plate is compensated by the optically anisotropic layer containing the rod-like liquid crystal compound in the homogeneous orientation state, which has an angle of less than 5 degrees between transmission axis of the polarizing film and the average alignment direction of the major axes of the liquid crystal molecules.

The optically anisotropic layer containing the discotic liquid crystal compound in the homeotropic orientation state and the optically anisotropic layer containing the rod-like liquid crystal compound in the homogeneous orientation state preferably have a retardation Rth of 150 to 500 nm and a retardation Re of 20 to 70 nm.

(Other Liquid Crystal Display Device)

ECB and STN mode liquid crystal display devices can be optically compensated in the same manner as above.

(a) Formation of Antireflection Layer (Antireflection Film)

An antireflection film may be formed on the thermoplastic film of the present invention. The antireflection film is generally obtained by forming a low refractive index layer (an antifouling layer) and at least one layer having a higher refractive index (such as a high refractive index layer or a middle refractive index layer) on a transparent support.

For example, the multilayer antireflection film containing transparent thin layers of inorganic compounds (such as metal oxides) having different refractive indices may be obtained such that a colloidal metal oxide particle layer is formed by a chemical vapor deposition (CVD) method, a physical vapor deposition (PVD) method, or a sol-gel method using a metal compound (such as a metal alkoxide), and then subjected to an aftertreatment (such as an ultraviolet irradiation treatment described in Japanese Laid-Open Patent Publication No. 9-157855, or a plasma treatment described in Japanese Laid-Open Patent Publication No. 2002-327310).

The antireflection film may be obtained by a multilayer coating method with high productivity using a dispersion prepared by dispersing inorganic particles in a matrix.

Further, the antireflection film obtained by the coating method may contain an uppermost layer having a fine-rough surface to exhibit an antidazzle property.

The antireflection film may be formed on the thermoplastic film of the present invention by any one of the above methods. The coating-type antireflection film, formed by the coating method, is particularly preferred in this invention.

(a-1) Layer Structure of Coating-Type Antireflection Film

The antireflection film may have a layer structure containing at least the middle refractive index layer, the high refractive index layer, and the low refractive index layer (the outermost layer). The refractive index layers may be formed in this order on the support, and have refractive indices satisfying the following condition: Refractive index of high refractive index layer>Refractive index of middle refractive index layer>Refractive index of transparent support>Refractive index of low refractive index layer.

A hard coat layer may be formed between the transparent support and the middle refractive index layer. The antireflection film may have a middle refractive index hard coat layer, the high refractive index layer, and the low refractive index layer.

The antireflection film is described in Japanese Laid-Open Patent Publication Nos. 8-122504, 8-110401, 10-300902, 2002-243906, and 2000-111706, etc.

Further, each layer of the antireflection film may have another function. For example, the antireflection film may have an antifouling low refractive index layer or an antistatic high refractive index layer (described in Japanese Laid-Open Patent Publication Nos. 10-206603 and 2002-243906, etc.)

The haze of the antireflection film is preferably 5% or less, more preferably 3% or less. The strength of the film is preferably H or more, more preferably 2H or more, most preferably 3H or more, in a pencil hardness test in accordance with JIS K5400.

(a-2) High Refractive Index Layer and Middle Refractive Index Layer

The layer having a higher refractive index in the antireflection film is a hard layer containing at least a matrix binder and ultrafine particles of an inorganic compound. The ultrafine inorganic compound particles have an average particle size of 100 nm or less and a high refractive index.

The refractive index of the inorganic compound may be 1.65 or more, and is preferably 1.9 or more. Examples of the inorganic compounds include oxides of Ti, Zn, Sb, Sn, Zr, Ce, Ta, La, and In, and a multiple oxides of such metals.

To obtain the above properties, the ultrafine particles may be surface-treated with a surface treatment agent such as a silane coupling agent described in Japanese Laid-Open Patent Publication Nos. 11-295503, 11-153703, and 2000-9908, an anionic compound, or an organic metal coupling agent described in Japanese Laid-Open Patent Publication No. 2001-310432. The ultrafine particles may have a core-shell structure containing a core of high refractive index particles as described in Japanese Laid-Open Patent Publication No. 2001-166104, etc. Further, the ultrafine particles may be dispersed using a particular dispersant as described in Japanese Laid-Open Patent Publication No. 11-153703, U.S. Pat. No. 6,210,858, Japanese Laid-Open Patent Publication No. 2002-2776069, etc.

Examples of materials for the matrix include known thermoplastic resins and hardening resins.

It is also preferred that the high or middle refractive index layer comprises a composition containing a polyfunctional compound having at least two radical- and/or cation-polymerizable groups, or a composition containing an organic metal compound having a hydrolyzable group or a partly condensed derivative thereof. The compounds are described in Japanese Laid-Open Patent Publication Nos. 2000-47004, 2001-315242, 2001-31871, and 2001-296401, etc.

Further, it is also preferred that the high or middle refractive index layer is a colloidal metal oxide layer containing a hydrolytic condensation product of a metal alkoxide, or a hard layer containing a metal alkoxide composition. The layers are described in Japanese Laid-Open Patent Publication No. 2001-293818, etc.

The refractive index of high refractive index layer is generally 1.70 to 2.20. The thickness of the high refractive index layer is preferably 5 nm to 10 µm, more preferably 10 nm to 1 µm.

The refractive index of the middle refractive index layer is controlled between those of the low and high refractive index layers. The refractive index of the middle refractive index layer is preferably 1.50 to 1.70.

(a-3) Low Refractive Index Layer

The low refractive index layer may be formed on the high refractive index layer. The refractive index of the low refractive index layer is 1.20 to 1.55, preferably 1.30 to 1.50.

The low refractive index layer is preferably used as the outermost layer having a scratch resistance and an antifouling property. The surface of the low refractive index layer preferably has a lubricity to remarkably improve the scratch resistance. A thin film layer having such a surface may be formed by using a known silicone compound or fluorine-containing compound.

The refractive index of the fluorine-containing compound is preferably 1.35 to 1.50, more preferably 1.36 to 1.47. The fluorine-containing compound is preferably a compound having a fluorine atom content of 35% to 80% by mass and a crosslinkable or polymerizable functional group.

Examples of such compounds include those described in Japanese Laid-Open Patent Publication No. 9-222503, Paragraphs [0018] to [0026], Japanese Laid-Open Patent Publication No. 11-38202, Paragraphs [0019] to [0030], Japanese Laid-Open Patent Publication No. 2001-40284, Paragraphs [0027] to [0028], and Japanese Laid-Open Patent Publication No. 2000-284102.

The silicone compound preferably has a polysiloxane structure. In the structure, a polymer chain preferably has a hardening functional group or a polymerizable functional group to form a crosslinked structure in the layer. Examples of the silicone compounds include reactive silicones (such as SILAPLANE available from Chisso Corporation), and polysiloxanes having silanol end groups (such as those described in Japanese Laid-Open Patent Publication No. 11-258403).

It is preferred that the fluorine- and/or siloxane-containing polymer having a crosslinkable or polymerizable group is crosslinked or polymerized by light or heat in or after the step of applying an outermost layer coating composition containing a polymerization initiator, a sensitizer, etc.

Further, it is also preferred that a silane coupling agent having a particular fluorine-containing hydrocarbon group and an organic metal compound such as a silane coupling agent are hardened by a condensation reaction in the presence of a catalyst, to form a sol-gel hard layer.

Examples of such compounds include polyfluoroalkyl-containing silane compounds and partly hydrolyzed condensation derivatives thereof (such as compounds described in Japanese Laid-Open Patent Publication Nos. 58-142958, 58-147483, 58-147484, 9-157582, and 11-106704), and silyl compounds having a polyperfluoroalkylether group (a fluorine-containing, long-chain group) (such as compounds described in Japanese Laid-Open Patent Publication Nos. 2000-117902, 2001-48590, and 2002-53804).

The low refractive index layer may contain, in addition to the above component, an additive such as a filler, a silane coupling agent, a lubricant, or a surfactant. The filler may be composed of low refractive inorganic particles having an average primary particle diameter of 1 to 150 nm, or fine organic particles described in Japanese Laid-Open Patent Publication No. 11-3820, Paragraphs [0020] to [0038], etc. Examples of the inorganic particles include silicon dioxide particles (silica particles) and fluorine-containing particles of magnesium fluoride, calcium fluoride, barium fluoride, etc.

In the case of disposing the low refractive index layer below the outermost layer, the low refractive index layer may be formed by a gas phase method such as a vacuum deposition method, a sputtering method, an ion plating method, or a plasma CVD method. The low refractive index layer is preferably formed by a coating method in view of reducing the production costs.

The thickness of the low refractive index layer is preferably 30 to 200 nm, more preferably 50 to 150 nm, most preferably 60 to 120 nm.

(a-4) Hard Coat Layer

The hard coat layer may be formed on the transparent support to physically strengthen the antireflection film. The hard coat layer is particularly preferably formed between the transparent support and the high refractive index layer.

The hard coat layer is preferably formed by crosslinking or polymerizing a light- and/or heat-hardening compound.

The hardening compound preferably has a photopolymerizable functional group. Further, the organic metal compound having a hydrolyzable functional group is preferably an organic alkoxysilyl compound.

Specific examples of such compounds include those of the high refractive index layer.

Specific examples of compositions for the hard coat layer include those described in Japanese Laid-Open Patent Publication Nos. 2002-144913 and 2000-9908, and WO 00/46617.

The high refractive index layer may act also as the hard coat layer. In this case, the layer is preferably formed by dispersing fine particles in the same manner as mentioned above.

The hard coat layer may act also as an antidazzle layer (to be hereinafter described) having an antidazzle function (an antiglare function). The antidazzle function can be obtained by adding particles having an average particle size of 0.2 to 10 μm.

The thickness of the hard coat layer may be appropriately selected depending on the use. The thickness of the hard coat layer is preferably 0.2 to 10 μm, more preferably 0.5 to 7 μm.

The strength of the hard coat layer is preferably H or more, more preferably 2H or more, most preferably 3H or more, in a pencil hardness test in accordance with JIS K5400. Further, the hard coat layer preferably exhibits a smaller abrasion loss in a taber test in accordance with JIS K5400.

(a-5) Forward Scattering Layer

A forward scattering layer may be formed to improve the viewing angle properties in the up, down, left, and right directions of the liquid crystal display device according to the present invention. The forward scattering layer may act also as the hard coat layer, and such a layer may be formed by dispersing fine particles with different refractive indices in the hard coat layer.

The forward scattering coefficient of the forward scattering layer may be particularly controlled as described in Japanese Laid-Open Patent Publication No. 11-38208. The relative refractive indices of a transparent resin and fine particles in the forward scattering layer may be particularly controlled as described in Japanese Laid-Open Patent Publication No. 2000-199809. Further, the haze of the forward scattering layer may be controlled at 40% or more as described in Japanese Laid-Open Patent Publication No. 2002-107512.

(a-6) Other Layers

A primer layer, an antistatic layer, an undercoat layer, a protective layer, etc. may be formed in addition to the above layers.

(a-7) Application Method

Each layer of the antireflection film may be formed by an application method such as a dip coating method, an air-knife coating method, a curtain coating method, a roller coating method, a wire bar coating method, a gravure coating method, a microgravure coating method, or an extrusion coating method (see U.S. Pat. No. 2,681,294).

(a-8) Antiglare Function

The antireflection film may have an antiglare function of scattering an external light. The antiglare function can be obtained by forming concavity and convexity on the surface of the antireflection film. The haze of the antireflection film having the antiglare function is preferably 3% to 30%, more preferably 5% to 20%, most preferably 7% to 20%.

The method for forming the concavity and convexity on the antireflection film surface is not particularly limited as long as the surface state can be sufficiently maintained. For example, the concavity and convexity may be formed by using fine particles in the low refractive index layer as described in Japanese Laid-Open Patent Publication No. 2000-271878, etc. Further, the concavity and convexity may be formed by adding a small amount (0.1% to 50% by mass) of relatively large particles (particle size 0.05 to 2 μm) to an under layer of the low refractive index layer (the high refractive index layer, the middle refractive index layer, or the hard coat layer) and by forming the low refractive index layer on thus formed rough surface layer, as described in Japanese Laid-Open Patent Publication Nos. 2000-281410, 2000-95893, 2001-100004, and 2001-281407, etc. Furthermore, the concavity and convexity may be formed by physically transferring a rough shape onto the uppermost layer (the antifouling layer) using an embossing treatment or the like as described in Japanese Laid-Open Patent Publication Nos. 63-278839, 11-183710, and 2000-275401, etc.

[Measurement Method]

Measurement methods used in the present invention will be described below.

(1) Rth/Re Ratio and Rth/Re Ratio Range (a) Both 5-cm-wide ends of the film were slit, and 20 samples (3-cm square samples) were cut out at a regular interval over the entire width. Each side of the square was parallel to the MD (the film forming direction) or the TD (the width direction).

(b) Each sample film was left under conditions of 25° C. and a relative humidity 60% for 5 hours or more. Then, the retardation values of the sample film were measured under the same conditions at a wavelength of 550 nm from a direction perpendicular to the sample film surface and directions tilted at −50° to +50° at 10° intervals as described above, by using an automatic birefringence meter KOBRA-21ADH manufactured by Oji Scientific Instruments.

(c) The in-plane retardation (Re) was obtained from the retardation value from the perpendicular direction (the normal line direction), and the thickness direction retardation (Rth) was calculated from the retardation values from the perpendicular direction and the ±50° tilt directions within ±10° to ±50° from the perpendicular direction.

(d) The average of the Rth/Re values of the samples was obtained as the Rth/Re ratio of the film. Further, the difference between the maximum value and the minimum value of the measured Rth/Re values was obtained as the Rth/Re ratio range.

(2) Thermal Dimensional Change and Thermal Dimensional Change Unevenness (a) 5 MD samples and 5 TD samples having the following size are each cut out at a regular interval over the entire width.
  i) MD sample: MD 15 cm×TD 5 cm
  ii) TD sample: TD 15 cm×MD 5 cm (b) Each sample is left under conditions of 25° C. and 60% rh for 3 hours or more, and then the length L1 of the sample is measured under the same conditions using a 10-cm-long pin gage.

(c) The samples are left under a dry condition at 80° C. for 200 hours, and further left under conditions of 25° C. and 60% rh for 3 hours or more, and then the length L2 of the sample is measured under the same conditions using a 10-cm-long pin gage.

(d) The thermal dimensional changes of the MD samples and the TD samples (10 samples) are calculated using the following equation, and the average is used as the thermal dimensional change of the film.

Thermal dimensional change(%)=100×|$L2-L1$|/$L1$ (e) The thermal dimensional change unevenness is obtained on percentage such that the difference between the maximum and minimum values of the thermal dimensional changes (absolute values) of the 10 samples is divided by the average of the thermal dimensional changes of the 10 samples.

(3) Surface Roughness

The Ra was measured by using a compact laser interferometer F601 manufactured by Fujinon Corporation.

(4) Glass Transition Temperature (Tg)

20 mg of a sample was added to a measuring pan of a differential scanning calorimeter (DSC). The sample was heated from 30° C. to 250° C. at 10° C./minute under nitrogen flow (1st-run), cooled to 30° C. at −10° C./minute, and then reheated from 30° C. to 250° C. (2nd-run). A temperature, at which a baseline began to shift from the low temperature side in the 2nd-run, was measured as the glass transition temperature (Tg).

Examples

The characteristics of the present invention will be described more specifically with reference to Examples and Comparative Examples. Materials, amounts, ratios, treatment contents treatment procedures, and the like, used in Examples, may be changed without departing from the scope of the present invention. The following embodiments are, therefore, to be considered in all respects as illustrative and not restrictive.

1. Preparation of Unstretched Film (1) Cellulose Acylate Film (a) Melt Film Forming A cellulose acetate propionate film #CM according to Example 1 of Japanese Laid-Open Patent Publication No. 2007-98917 was prepared. The film #CM had a thickness of 100 μm and a Tg of 146° C.

A cellulose acylate film #CN according to Example 101 in Example B of Japanese Laid-Open Patent Publication No. 2007-169588 was prepared. The film #CN had a thickness of 100 μm and a Tg of 131° C.

(b) Solution-Cast Film Forming

A cellulose acetate propionate film #CS according to Film No. 1 described in Example 1 of Japanese Laid-Open Patent Publication No. 2001-188128 was prepared. The film #CS had a thickness of 100 μm and a Tg of 150° C.

(2) Cycloolefin Film (a) Melt Film Forming

The following resins were used for melt film forming.

Resin A: TOPAS6013 (Tg 130° C.) available from Polyplastics, Co., Ltd.

Resin B: APEL6015T (Tg 145° C.) available from Mitsui Chemicals, Inc.

Resin C: Compound (Tg 136° C.) according to Example 1 of WO 98/14499

Resin D: Resin A-1 (Tg 165° C.) described in Synthesis Example 1 of Japanese Laid-Open Patent Publication No. 2007-108529

Resin E: APEL6013T (Tg 125° C.) available from Mitsui Chemicals, Inc.

Each of the resins was dried at 110° C. by a vacuum dryer such that the water content was reduced to 0.1% or less. The resin was melted at 260° C. by using a uniaxial kneading extruder, discharged from a gear pump, and subjected to filtration using a leaf disc filter having a filtration accuracy of 5 μm. The melt (the melted resin) was transported to a static mixer, and extruded from a coat-hanger die having a slit of 0.8 mm and a temperature of 270° C. onto three casting rolls having temperatures of (Tg−5)° C., Tg ° C., and (Tg−10)° C. In this process, a touch roll was pressed to the uppermost-stream casting roll at the following pressure, to form an unstretched film having a thickness of 100 μm. The touch roll was a double pressing roll described in Example 1 of Japanese Laid-Open Patent Publication No. 11-235747, and the temperature thereof was controlled to Tg−5° C., and the thickness of the thin metal outer cylinder was controlled to 2 mm.

Then, both ends of the unstretched film were trimmed by 3% of the entire width, respectively, and the ends were thickening-treated to form a knurl having a width of 10 mm and a height of 20 μm, just before winding-up. Immediately after the thickening, 3000 m of the film was wound at a width of 1.5 m and at a rate of 30 m/minute.

| | Resin | Touch Roll Pressure |
|---|---|---|
| Film #OM1 | Resin A (addition polymerization) | 0 MPa (Not used) |
| Film #OM2 | Resin A (addition polymerization) | 0.1 MPa |
| Film #OM3 | Resin A (addition polymerization) | 1 MPa |
| Film #OM4 | Resin A (addition polymerization) | 4.5 MPa |
| Film #OM5 | Resin A (addition polymerization) | 6 MPa |
| Film #OM6 | Resin B (addition polymerization) | 1 MPa |
| Film #OM7 | Resin C (ring-opening polymerization) | 1 MPa |
| Film #OM8 | Resin D (ring-opening polymerization) | 1 MPa |
| Film #OM9 | Resin E (addition polymerization) | 1 MPa |

(b) Solution-Cast Film Forming

A film #OS according to a production example described in Japanese Laid-Open Patent Publication No. 2007-108529 was prepared. The film #OS contained the above Resin D, and had a thickness of 100 μm and a Tg of 165° C.

2. Transverse Stretching and Longitudinal Shrinkage

Each of the above unstretched films was transversely tenter-stretched at Tg+5° C. at a stretching magnification shown in Tables 1-1 to 1-4 and 2-1 to 2-3. Then, the stretched film was longitudinally shrunk under conditions shown in Tables 1-1 to 1-4. The longitudinal shrinkage was carried out in a heat-treating zone, in which 10 rolls having a diameter of 40 cm were disposed to obtain a G/D ratio shown in Tables 1-1 to 1-4 and 2-1 to 2-3. Several films were longitudinally stretched at Tg+10° C. at a stretching magnification shown in Tables 1-1 to 1-4 and 2-1 to 2-3 before the transverse stretching. The longitudinal stretching magnification of 1 shown in the tables means that the longitudinal stretching was not carried out.

The Re (average of 20 samples disposed in the width direction), the Rth/Re ratio, the Re/Rth ratio range, the surface roughness, the thermal dimensional change, the thermal dimensional change unevenness, and the scratch of each transversely stretched, longitudinally shrunk, thermoplastic film were measured by the above described methods. The results are shown in Tables 1-1 to 1-4 and 2-1 to 2-3. The scratch was evaluated by visually observing 100 m of the film.

Further, the orientation angles of the obtained films according to the present invention were measured in the same manner as Example 1 of Japanese Laid-Open Patent Publication No. 2007-108529. As a result, the orientation angles were 90±10, and the slow axes were oriented in the TD.

The thermal dimensional changes shown in Tables 1-1 to 1-4 were measured under conditions of 80° C. and 200 hrs as described above. Even when the films were heat-treated for 500 hrs, the thermal dimensional changes were substantially not changed.

In Tables 1-1 to 1-4, the films of Examples 1-27 and 1-28 were produced in the same manner as Example 1-2 except for fixing the film on the roll in the longitudinal shrinkage treatment. In Example 1-27, the film was fixed (edge-pinned) at both ends (5% of the entire width) by applying an electrostatic force. In this process, an electrostatic edge pinning unit (a direct-current stabilized power source PSE-2005N and an electrode HDE-20R-54) manufactured by Kasuga Electric Works Ltd. was used at a pinning voltage of −10 kV. In Example 1-28, a suction drum is used as the roll to fix the film over the entire width. In Example 1-29, nip rolls were disposed on the roll, and the diameter of the nip rolls was one-tenth as large as that of the roll. The number of the nip rolls was Y/X, in which X was the roll diameter and Y was the lap length on the roll. The length of the nip rolls was 5% of the entire width, and the nip rolls were disposed at both ends.

3. Surface Treatment (1) Cellulose Acylate Film

Each film was soaked in a 2.0-N potassium hydroxide solution at 25° C. for 2 minutes, neutralized with sulfuric acid, washed with pure water, and dried. The surface energy of PK-1 was measured by a contact angle method. As a result, the films had a surface energy of 60 to 65 mN/m.

(2) Film Other than Cellulose Acylate Film

Each film was subjected to a corona discharge treatment under the following conditions.

Electrode: Coron-Plus available from VETAPONE
Generator: CP1C
Output: 900 W
Film transporting speed: 6 m/minute 4. Preparation of Oriented Film for Optically Anisotropic Layer A coating liquid having the following composition was applied to each thermoplastic film at 28 mL/m² by using a #16 wire bar coater. The applied liquid was dried by 60° C. hot air for 60 seconds, and further dried by 90° C. hot air for 150 seconds.

| | |
|---|---|
| (1) Composition of oriented film coating liquid Following modified polyvinyl alcohol | 20 parts by mass |
| Water | 360 parts by mass |
| Methanol | 120 parts by mass |
| Glutaraldehyde (crosslinking agent) | 1.0 part by mass |

Modified polyvinyl alcohol

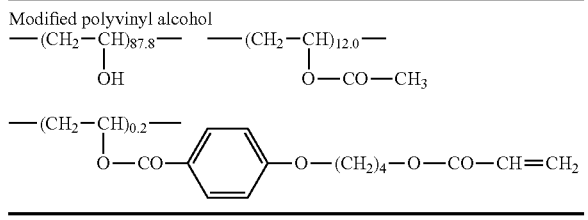

(2) Preparation of Optically Anisotropic Layer

The following coating liquid was continuously applied to the oriented film while transporting the film at 30 mm/minute. In this process, a #3.2 wire bar was rotated at 1171 revolution in the same direction as the film transporting direction. The film was heated continuously from the room temperature to 100° C. to evaporate the solvent, and then heated at 135° C. for about 90 seconds in a drying zone such that an air flow was applied to the discotic liquid crystal compound layer at a rate of 1.5 m/sec in the direction parallel to the film transporting direction. Thus, the discotic liquid crystal molecules were oriented. Then the film was transported to a drying zone at 80° C., and irradiated for 4 seconds with an ultraviolet ray having an intensity of 600 mW. In this irradiation, the surface temperature of the film was about 100° C., and an ultraviolet irradiation device (an ultraviolet lamp having an output of 160 W/cm and an irradiation length of 1.6 m) was used. A crosslinking reaction was carried out in this manner to fix the orientation state of the discotic liquid crystal molecules. Then, the film was cooled to the room temperature, and wound into a roll. The formed optically anisotropic layer had a thickness of 1.3 μm.

Further, the formed optical compensatory sheet had an elasticity of 2.4 MPa.

(Composition of Optically Anisotropic Layer Coating Liquid)

The coating liquid was prepared by dissolving the following composition in 97 parts by mass of methyl ethyl ketone.

| | |
|---|---|
| Discotic liquid crystal compound (1) of the following chemical formula | 41.01 parts by mass |
| Ethylene oxide-modified trimethylolpropane triacrylate (V#360 available from Osaka Organic Chemical Industry Ltd.) | 4.06 parts by mass |
| Cellulose acetate butyrate (CAB551-0.2 available from Eastman Chemical Company) | 0.34 parts by mass |
| Cellulose acetate butyrate (CAB531-1 available from Eastman Chemical Company) | 0.11 parts by mass |
| Fluoroaliphatic group-containing polymer 1 of the following chemical formula | 0.56 parts by mass |
| Fluoroaliphatic group-containing polymer 2 of the following chemical formula | 0.06 parts by mass |
| Photopolymerization initiator (IRGACURE 907 available from Ciba-Geigy) | 1.35 parts by mass |
| Sensitizer (KAYACURE DETX available from Nippon Kayaku Co., Ltd.) | 0.45 parts by mass |

Discotic liquid crystal compound (1)

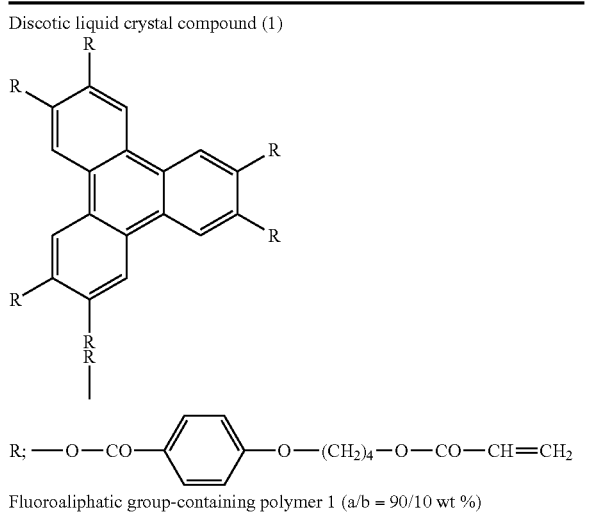

Fluoroaliphatic group-containing polymer 1 (a/b = 90/10 wt %)

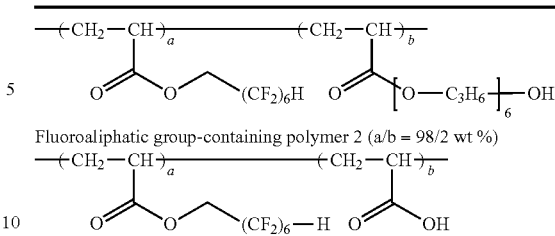

Fluoroaliphatic group-containing polymer 2 (a/b = 98/2 wt %)

Polarizing plates were placed in the crossed nicols state, and the unevenness of the obtained optical compensatory sheet was evaluated. As a result, the unevenness was not detected from the normal line direction and the direction tilted at 60 degrees against the normal line.

(3) Preparation of Polarizing Plate

An 80-μm-thick polyvinyl alcohol (PVA) film was soaked in an aqueous solution containing 0.05% by mass of iodine at 30° C. for 60 seconds, and thereby colorized. The film was longitudinally stretched at 5 times magnification in an aqueous solution containing 4% by mass of boric acid for 60 seconds. The film was dried at 50° C. for 4 minutes to prepare a polarizing film having a thickness of 20 μm.

An optical compensatory sheet was soaked in a 1.5-mol/L aqueous sodium hydroxide solution at 55° C., and then water-washed to remove sodium hydroxide. The sheet was soaked in a 0.005-mol/L aqueous dilute sulfuric acid solution at 35° C. for 1 minute, and then soaked in water to sufficiently remove the aqueous dilute sulfuric acid solution. The sheet was sufficiently dried at 120° C.

A commercially available cellulose acylate film was saponified in the same manner. Then, the above polarizing film was sandwiched between the saponified optical compensatory sheet and the cellulose acylate film. The films were bonded by using a polyvinyl alcohol adhesive to obtain a polarizing plate. The commercially available cellulose acylate film was FUJITAC TF80UL manufactured by FUJIFILM Corporation. In this process, the polarizing film and protective films disposed on both sides of the polarizing film were in the roll form, so that they were continuously bonded in parallel with each other. Therefore, the longitudinal direction of the optical compensatory sheet (the casting direction of the cellulose acylate film) was parallel to the absorption axis of the polarizer.

5. Evaluation in TN Liquid Crystal Panel

From a liquid crystal display device having a TN liquid crystal panel (MDT-191S manufactured by Mitsubishi Electric Corporation), a pair of original polarizing plates were peeled off. Instead of the original polarizing plates, the polarizing plates produced above were attached to the observer side and the backlight side using a bonding agent respectively such that the optical compensatory sheets faced the liquid crystal cell. The polarizing plates were placed such that the transmission axes of the observer-side polarizing plate and the backlight-side polarizing plate were in the 0 mode. Thus obtained TN liquid crystal panel was thermotreated under a dry condition at 80° C. for 200 hours. After the thermotreatment, the TN liquid crystal panel was left under conditions of 25° C. and 60% rh for 8 hours, and the liquid crystal display device was evaluated as follows.

(a) Contrast and Contrast Unevenness

The transmission luminance of the liquid crystal display device was measured using a spectral radiant luminance meter under an ordinary interior fluorescent illumination. In this measurement, the liquid crystal display device was horizontally placed, and the luminance was measured in the ON and OFF states while changing the polar angle within a range of 0° to 80° from the normal line at 10° intervals and changing the azimuth angle at 100 intervals at each polar angle. The luminance ratios between the ON and OFF state were calculated as the contrast ratios. The total of the contrast ratios at all polar and azimuth angles is shown as the contrast in Tables 1-1 to 1-4 and 2-1 to 2-3. Further, the entire screen was divided into 100 equal parts, and the contrast values of the 100 parts were measured in this manner. The contrast unevenness was obtained on percentage such that the difference between the maximum and minimum values of the contrast values divided by the average value.

(b) Light Leakage

A black color was displayed on the liquid crystal display device, and an area showing light leakage was visually observed. The area was shown on percentage based on the entire display screen area.

(c) Evaluation Results

The results of evaluating the conditions of the longitudinal shrinkage, etc. are shown in Tables 1-1 to 1-4.

The influences of the G/D ratios in the longitudinal shrinkage were evaluated in Examples 1-1 to 1-7 and Comparative Examples 1-1 to 1-2. In Comparative Example 1-1, the G/D ratio was smaller than the range according to the present invention, so that the Rth/Re ratio range and the contrast unevenness were increased. Further, also the thermal dimensional change and the light leakage were increased. In Comparative Example 1-2, the G/D ratio was larger than the range according to the present invention, so that the Rth/Re ratio was increased and the contrast was reduced. On the other hand, when the G/D ratio was within the range according to the present invention, excellent properties were obtained.

The influences of the V2/V1 ratios were evaluated in Examples 1-8 to 1-10, 1-23, and 1-24, and Comparative Examples 1-3 and 1-4. In Comparative Example 1-3, the V2/V1 ratio was larger than the range according to the present invention, so that the Rth/Re ratio was increased and the contrast was reduced. When the V2/V1 ratio was smaller than the range according to the present invention, the thermal dimensional change was excessively small, the light leakage was increased, and the scratch in the longitudinal shrinkage was increased. On the other hand, when the V2/V1 ratio was within the range according to the present invention, excellent properties were obtained.

The influences of the longitudinal shrinkage temperatures were evaluated in Examples 1-11 to 1-14. It was preferred that the longitudinal shrinkage temperature was within a range of $(Tg-20)°$ C. to $(Tg+50)°$ C. When the longitudinal shrinkage temperature was higher than the range, the Rth/Re ratio was increased and the contrast was reduced in some cases. When the longitudinal shrinkage temperature was lower than the range, the Rth/Re ratio could not be reduced, and further the thermal dimensional change was increased, the contrast was reduced, and the light leakage was increased in some cases. On the other hand, when the longitudinal shrinkage temperature was within the preferred range according to the present invention, excellent properties were obtained.

The influences of the touch roll conditions and surface roughnesses were evaluated in Examples 1-15 to 1-19. When the surface roughness was excessively small, the friction between the surface and the roll was excessively large, so that the scratch was generated as shown in Example 1-19. When the surface roughness was excessively large, the Rth/Re ratio and the Rth/Re ratio range were increased, the contrast was slightly reduced, and the contrast unevenness was slightly increased, as shown in Example 1-15. On the other hand, when surface roughness was within the range of 0.0005 to 0.004, excellent properties were obtained.

The influences of the stretching magnifications were evaluated in Examples 1-20 to 1-22. When the stretching magnification was within the preferred range (1.1 to 3.0 times) according to the present invention, excellent properties were obtained. However, in Example 1-22, the stretching magnification was 3.1 times, so that the Rth/Re ratio and the thermal dimensional change were increased, and the contrast unevenness and the light leakage were also slightly increased.

The influences of the fixation of both film ends in the longitudinal shrinkage were evaluated in Examples 1-2, 1-27, 1-28, and 1-29. In Examples 1-27, 1-28, and 1-29, the both film ends were fixed by the edge pinning method, the suction drum method, or the nip roll method, respectively, so that the liquid crystal display properties (the contrast unevenness and the light leakage) were more excellent, as compared with Example 1-2 in which the ends were not fixed.

The results of evaluating the film types are shown in Tables 2-1 to 2-3.

The film materials used in the melt film forming method are compared. The addition-polymerized cycloolefin used in Examples 2-3, 2-4, and 2-13 exhibited a high Re generation, a small Rth/Re ratio range, a small contrast unevenness, and a small light leakage, and thereby was particularly excellent.

The ring-opening-polymerized cycloolefin used in Examples 2-5 and 2-6 was excellent, following the addition-polymerized cycloolefin. The ring-opening-polymerized cycloolefin exhibited a larger Rth/Re ratio range, a larger thermal dimensional change, a slightly larger contrast unevenness, and a slightly larger light leakage, as compared with the addition-polymerized cycloolefin used in Examples 2-3 and 2-4.

The cellulose acylate used in Examples 2-1, 2-2, and 2-12 exhibited a smaller Re, a larger Rth/Re ratio range, a larger thermal dimensional change, a slightly lower contrast, a slightly larger contrast unevenness, and a slightly larger light leakage, as compared with the addition- or ring-opening-polymerized cycloolefins.

The lactone ring-containing polymer and the polycarbonate were used in Examples 2-8 to 2-10. The polycarbonate was prepared according to Example 1 of Japanese Laid-Open Patent Publication No. 2006-277914 and Example 1 of Japanese Laid-Open Patent Publication No. 2006-284703 without the longitudinal stretching. The film of the lactone ring-containing polymer was formed according to Example 1 of WO 2006/025445, though the film width was made 1.5 m. These original films (unstretched films) had a thickness of 100 μm. Also these films exhibited excellent properties in the order of Examples 2-10, 2-8, and 2-9.

The film forming methods were compared in Examples 2-1 and 2-2 (the cellulose acylate) and Examples 2-6 and 2-7 (the cycloolefin). In every case, the film obtained by the solution-cast film forming method exhibited slightly small Rth/Re ratio range, thermal dimensional change, contrast unevenness, and light leakage, as compared with the film obtained by the melt film forming method.

The longitudinal shrinkage of the present invention and the longitudinal shrinkage of Example 1 of Japanese Laid-Open Patent Publication No. 2007-108529 (the film being longitudinally shrunk and transversely stretched simultaneously in a tenter using a simultaneous biaxial stretching machine) were compared using the same film in Example 2-7 and Comparative Example 2-1. In Examples 2-7, the Rth/Re ratio range and the thermal dimensional change were reduced, so that the contrast unevenness and the light leakage were significantly reduced.

In Comparative Example 2-2, ZEONOR (Tg: 136° C.) was longitudinally shrunk and transversely stretched simultaneously according to Example 1 of Japanese Laid-Open Patent Publication No. 2006-133720. On the other hand, in Example 2-11, ZEONOR was transversely stretched and then longitudinally shrunk on rolls under the (G/D) condition according to the present invention, at the same transverse stretching magnification and longitudinal shrinkage as Comparative Example 2-2 In Example 2-8, the Rth/Re ratio range and the thermal dimensional change were reduced, so that the contrast unevenness and the light leakage were significantly reduced.

TABLE 1-1

| | Film | Surface Roughness Ra (μm) | Longitudinal Stretching Magnification | Transverse Stretching Magnification | Longitudinal Shrinkage | | Temperature (° C.) |
|---|---|---|---|---|---|---|---|
| | | | | | G/D | V2/V1 | |
| Comparative Example 1-1 | #OM3 | 0.015 | 1 | 1.4 | 0.005 | 0.75 | Tg + 5 |
| Example 1-1 | #OM3 | 0.015 | 1 | 1.4 | 0.012 | 0.75 | Tg + 5 |
| Example 1-2 | #OM3 | 0.015 | 1 | 1.4 | 0.032 | 0.75 | Tg + 5 |
| Example 1-3 | #OM3 | 0.015 | 1 | 1.4 | 0.052 | 0.75 | Tg + 5 |
| Example 1-4 | #OM3 | 0.015 | 1 | 1.4 | 0.10 | 0.75 | Tg + 5 |
| Example 1-5 | #OM3 | 0.015 | 1 | 1.4 | 0.42 | 0.75 | Tg + 5 |
| Example 1-6 | #OM3 | 0.015 | 1 | 1.4 | 0.9 | 0.75 | Tg + 5 |
| Example 1-7 | #OM3 | 0.015 | 1 | 1.4 | 2.9 | 0.75 | Tg + 5 |
| Comparative Example 1-2 | #OM3 | 0.015 | 1 | 1.4 | 3.1 | 0.75 | Tg + 5 |
| Comparative Example 1-3 | #OM3 | 0.015 | 1.2 | 1.8 | 0.5 | 1 | Tg + 15 |
| Example 1-8 | #OM3 | 0.015 | 1.2 | 1.8 | 0.5 | 0.98 | Tg + 15 |
| Example 1-9 | #OM3 | 0.015 | 1.2 | 1.8 | 0.5 | 0.75 | Tg + 15 |
| Example 1-10 | #OM3 | 0.015 | 1.2 | 1.8 | 0.5 | 0.62 | Tg + 15 |
| Comparative Example 1-4 | #OM3 | 0.015 | 1.2 | 1.8 | 0.5 | 0.55 | Tg + 15 |
| Example 1-11 | #OM3 | 0.015 | 1.1 | 2.2 | 0.7 | 0.82 | Tg − 25 |
| Example 1-12 | #OM3 | 0.015 | 1.1 | 2.2 | 0.7 | 0.82 | Tg − 18 |
| Example 1-13 | #OM3 | 0.015 | 1.1 | 2.2 | 0.7 | 0.82 | Tg + 45 |
| Example 1-14 | #OM3 | 0.015 | 1.1 | 2.2 | 0.7 | 0.82 | Tg + 55 |

TABLE 1-2

| | Film | Surface Roughness Ra (μm) | Longitudinal Stretching Magnification | Transverse Stretching Magnification | Longitudinal Shrinkage | | Temperature (° C.) |
|---|---|---|---|---|---|---|---|
| | | | | | G/D | V2/V1 | |
| Example 1-15 | #OM1 | 0.038 | 1 | 1.4 | 0.1 | 0.75 | Tg + 5 |
| Example 1-16 | #OM2 | 0.025 | 1 | 1.4 | 0.1 | 0.75 | Tg + 5 |
| Example 1-18 | #OM4 | 0.007 | 1 | 1.4 | 0.1 | 0.75 | Tg + 5 |
| Example 1-19 | #OM5 | 0.003 | 1 | 1.4 | 0.1 | 0.75 | Tg + 5 |
| Example 1-20 | #OM3 | 0.015 | 1 | 1.1 | 0.3 | 0.65 | Tg + 20 |
| Example 1-21 | #OM3 | 0.015 | 1 | 3.0 | 0.3 | 0.65 | Tg + 20 |
| Example 1-22 | #OM3 | 0.015 | 1 | 3.1 | 0.3 | 0.65 | Tg + 20 |
| Example 1-23 | #OM3 | 0.015 | 1.2 | 1.8 | 0.5 | 0.999 | Tg + 15 |
| Example 1-24 | #OM3 | 0.015 | 1.2 | 1.8 | 0.5 | 0.99 | Tg + 15 |
| Example 1-25 | #OM3 | 0.015 | 1.2 | 1.8 | 0.5 | 0.67 | Tg + 15 |
| Example 1-26 | #OM3 | 0.015 | 1.1 | 2.2 | 0.7 | 0.82 | Tg + 10 |
| Example 1-27 | #OM3 | 0.015 | 1 | 1.4 | 0.032* | 0.75 | Tg + 5 |
| Example 1-28 | #OM3 | 0.015 | 1 | 1.4 | 0.032** | 0.75 | Tg + 5 |
| Example 1-29 | #OM3 | 0.015 | 1 | 1.4 | 0.032*** | 0.75 | Tg + 5 |

Thermal shrinkage G/W
*The both ends of the film were fixed on the roll by the electrostatic application (edge pinning).
**The entire surface of the film was fixed on the roll by the suction drum.
***The both ends of the film were fixed on the roll by the nip rolls.

TABLE 1-3

| | Film Properties | | | | | Liquid Crystal Display Properties | | |
|---|---|---|---|---|---|---|---|---|
| | Re (nm) | Rth/Re Ratio | Rth/Re Ratio Range | Thermal Dimensional Change (%) | Thermal Dimensional Change Unevenness (%) | Scratch | Contrast | Contrast Unevenness (%) | Light Leakage (%) |
| Comparative Example 1-1 | 80 | 0.70 | 0.12 | 0.34 | 10 | None | 120 | 8 | 25 |

TABLE 1-3-continued

| | | | Film Properties | | | Liquid Crystal Display Properties | | |
|---|---|---|---|---|---|---|---|---|
| | Re (nm) | Rth/Re Ratio | Rth/Re Ratio Range | Thermal Dimensional Change (%) | Thermal Dimensional Change Unevenness (%) | Scratch | Contrast | Contrast Unevenness (%) | Light Leakage (%) |
| Example 1-1 | 81 | 0.70 | 0.07 | 0.27 | 4 | None | 120 | 3 | 5 |
| Example 1-2 | 80 | 0.72 | 0.05 | 0.15 | 3 | None | 115 | 2 | 2 |
| Example 1-3 | 79 | 0.74 | 0.03 | 0.12 | 1 | None | 110 | 0 | 0 |
| Example 1-4 | 79 | 0.75 | 0.03 | 0.10 | 1 | None | 110 | 0 | 0 |
| Example 1-5 | 81 | 0.77 | 0.03 | 0.10 | 1 | None | 110 | 0 | 0 |
| Example 1-6 | 82 | 0.80 | 0.04 | 0.008 | 3 | None | 105 | 2 | 0 |
| Example 1-7 | 80 | 0.91 | 0.07 | 0.007 | 4 | None | 95 | 3 | 0 |
| Comparative Example 1-2 | 35 | 1.10 | 0.13 | 0.007 | 8 | None | 45 | 9 | 0 |
| Comparative Example 1-3 | 40 | 1.15 | 0.05 | 0.14 | 11 | None | 35 | 3 | 5 |
| Example 1-8 | 39 | 0.83 | 0.03 | 0.09 | 4 | None | 90 | 0 | 0 |
| Example 1-9 | 39 | 0.67 | 0.02 | 0.02 | 1 | None | 130 | 0 | 0 |
| Example 1-10 | 39 | 0.52 | 0.03 | 0.003 | 4 | Slight | 140 | 0 | 5 |
| Comparative Example 1-4 | 15 | 0.52 | 0.05 | 0 | 0 | Large | 140 | 0 | 18 |
| Example 1-11 | 200 | 0.95 | 0.06 | 0.26 | 6 | None | 88 | 3 | 5 |
| Example 1-12 | 200 | 0.80 | 0.02 | 0.13 | 2 | None | 110 | 0 | 0 |
| Example 1-13 | 195 | 0.78 | 0.03 | 0.01 | 1 | None | 115 | 0 | 0 |
| Example 1-14 | 175 | 0.96 | 0.07 | 0.005 | 5 | None | 90 | 3 | 0 |

TABLE 1-4

| | | | Film Properties | | | Liquid Crystal Display Properties | | |
|---|---|---|---|---|---|---|---|---|
| | Re (nm) | Rth/Re Ratio | Rth/Re Ratio Range | Thermal Dimensional Change (%) | Thermal Dimensional Change Unevenness (%) | Scratch | Contrast | Contrast Unevenness (%) | Light Leakage (%) |
| Example 1-15 | 80 | 0.85 | 0.05 | 0.03 | 5 | None | 100 | 2 | 0 |
| Example 1-16 | 81 | 0.78 | 0.04 | 0.06 | 3 | None | 110 | 0 | 0 |
| Example 1-18 | 82 | 0.70 | 0.02 | 0.10 | 2 | Slight | 118 | 0 | 0 |
| Example 1-19 | 82 | 0.70 | 0.02 | 0.22 | 2 | Small | 120 | 2 | 6 |
| Example 1-20 | 20 | 0.57 | 0.03 | 0.001 | 2 | None | 70 | 0 | 0 |
| Example 1-21 | 290 | 0.54 | 0.04 | 0.27 | 4 | None | 180 | 3 | 2 |
| Example 1-22 | 300 | 0.51 | 0.08 | 0.29 | 6 | None | 180 | 6 | 6 |
| Example 1-23 | 40 | 0.99 | 0.09 | 0.11 | 8 | None | 55 | 1 | 2 |
| Example 1-24 | 40 | 0.90 | 0.05 | 0.10 | 6 | None | 70 | 0 | 0 |
| Example 1-25 | 39 | 0.60 | 0.03 | 0.011 | 2 | None | 135 | 0 | 1 |
| Example 1-26 | 200 | 0.65 | 0.01 | 0.03 | 1 | None | 145 | 0 | 0 |
| Example 1-27 | 80 | 0.75 | 0.03 | 0.11 | 1 | None | 110 | 0 | 0 |
| Example 1-28 | 80 | 0.75 | 0.03 | 0.10 | 1 | None | 110 | 0 | 0 |
| Example 1-29 | 80 | 0.75 | 0.03 | 0.10 | 1 | None | 110 | 0 | 0 |

TABLE 2-1

| | Film | Resin | | Film Forming Method |
|---|---|---|---|---|
| Example 2-1 | #CM | Cellulose acylate | | Melt method |
| Example 2-2 | #CS | Cellulose acylate | | Solution method |
| Example 2-3 | #OM3 | Cycloolefin | Addition polymerization | Melt method |
| Example 2-4 | #OM6 | Cycloolefin | Addition polymerization | Melt method |
| Example 2-5 | #OM7 | Cycloolefin | Ring-opening polymerization | Melt method |
| Example 2-6 | #OM8 | Cycloolefin | Ring-opening polymerization | Melt method |
| Example 2-7 | #OS | Cycloolefin | Ring-opening polymerization | Solution method |
| Example 2-8 | PC-1 | Polycarbonate | | Melt method |
| Example 2-9 | PC-2 | Polycarbonate | | Solution method |
| Example 2-10 | Lactone | Lactone | | Melt method |
| Comparative Example 2-1 | #OS | Cycloolefin | Ring-opening polymerization | Solution method |

TABLE 2-1-continued

|  | Film | Resin | Film Forming Method |
|---|---|---|---|
| Comparative Example 2-2 | ZEONOR | Cycloolefin | Ring-opening polymerization | Melt method |
| Example 2-11 | ZEONOR | Cycloolefin | Ring-opening polymerization | Melt method |
| Example 2-12 | #CN | Cellulose acylate |  | Melt method |
| Example 2-13 | #OM9 | Cycloolefin | Addition polymerization | Melt method |

*PC-1: Prepared according to Example 1 of Japanese Laid-Open Patent Publication No. 2006-277914.
PC-2: Prepared according to Example 1 of Japanese Laid-Open Patent Publication No. 2006-284703.
Lactone: Prepared according to Example 1 of WO 2006/025445.

TABLE 2-2

|  | Surface Roughness Ra (μm) | Longitudinal Stretching Magnification | Transverse Stretching Magnification | Longitudinal Shrinkage | | Temperature (° C.) |
|---|---|---|---|---|---|---|
|  |  |  |  | G/D | V2/V1 |  |
| Example 2-1 | 0.055 | 1.0 | 2.0 | 0.2 | 0.7 | Tg + 20 |
| Example 2-2 | 0.85 | 1.0 | 2.0 | 0.2 | 0.7 | Tg + 20 |
| Example 2-3 | 0.015 | 1.0 | 2.0 | 0.2 | 0.7 | Tg + 20 |
| Example 2-4 | 0.015 | 1.0 | 2.0 | 0.2 | 0.7 | Tg + 20 |
| Example 2-5 | 0.035 | 1.0 | 2.0 | 0.2 | 0.7 | Tg + 20 |
| Example 2-6 | 0.035 | 1.0 | 2.0 | 0.2 | 0.7 | Tg + 20 |
| Example 2-7 | 0.095 | 1.0 | 2.0 | 0.2 | 0.7 | Tg + 20 |
| Example 2-8 | 0.025 | 1.0 | 2.0 | 0.2 | 0.7 | Tg + 20 |
| Example 2-9 | 0.075 | 1.0 | 2.0 | 0.2 | 0.7 | Tg + 20 |
| Example 2-10 | 0.015 | 1.0 | 2.0 | 0.2 | 0.7 | Tg + 20 |
| Comparative Example 2-1 | 0.095 | 1.0 | 2.0 | *Following | 0.7 | Tg + 20 |
| Comparative Example 2-2 | 0.035 | 1.0 | 1.25 | **Following | 0.9 | Tg − 1 |
| Example 2-11 | 0.035 | 1.0 | 1.25 | 0.1 | 0.9 | Tg − 1 |
| Example 2-12 | 0.045 | 1.0 | 2.0 | 0.2 | 0.7 | Tg + 20 |
| Example 2-13 | 0.015 | 1.0 | 2.0 | 0.2 | 0.7 | Tg + 20 |

Longitudinal shrinkage G/W
*Comparative Example 2-1: A simultaneous biaxial stretching machine was used according to Example 1 of Japanese Laid-Open Patent Publication No. 2007-108529.
** Comparative Example 2-2: A simultaneous biaxial stretching machine was used according to Example 1 of Japanese Laid-Open Patent Publication No. 2006-133720 (simultaneous TD stretching and longitudinal shrinkage)

TABLE 2-3

|  | Film Properties | | | | | | Liquid Crystal Display Properties | | |
|---|---|---|---|---|---|---|---|---|---|
|  | Re (nm) | Rth/Re Ratio | Rth/Re Ratio Range | Thermal Dimensional Change (%) | Thermal Dimensional Change Unevenness (%) | Scratch | Contrast | Contrast Unevenness (%) | Light Leakage (%) |
| Example 2-1 | 75 | 0.85 | 0.07 | 0.18 | 8 | None | 55 | 3 | 6 |
| Example 2-2 | 60 | 0.90 | 0.09 | 0.24 | 8 | None | 40 | 5 | 9 |
| Example 2-3 | 180 | 0.52 | 0.02 | 0.04 | 1 | None | 100 | 0 | 0 |
| Example 2-4 | 175 | 0.53 | 0.03 | 0.07 | 1 | None | 100 | 0 | 0 |
| Example 2-5 | 165 | 0.54 | 0.05 | 0.15 | 3 | None | 100 | 2 | 3 |
| Example 2-6 | 160 | 0.54 | 0.05 | 0.16 | 4 | None | 100 | 2 | 4 |
| Example 2-7 | 150 | 0.55 | 0.08 | 0.21 | 7 | None | 100 | 4 | 7 |
| Example 2-8 | 240 | 0.70 | 0.04 | 0.09 | 4 | None | 90 | 2 | 3 |
| Example 2-9 | 200 | 0.80 | 0.08 | 0.22 | 8 | None | 60 | 4 | 6 |
| Example 2-10 | 120 | 0.55 | 0.03 | 0.07 | 2 | None | 95 | 1 | 1 |
| Comparative Example 2-1 | 142 | 0.55 | 0.15 | 0.35 | 12 | None | 100 | 10 | 30 |
| Comparative Example 2-2 | 110.4 | 0.91 | 0.14 | 0.37 | 15 | None | 30 | 12 | 35 |
| Example 2-11 | 115 | 0.85 | 0.08 | 0.21 | 3 | None | 60 | 4 | 8 |
| Example 2-12 | 85 | 0.81 | 0.06 | 0.14 | 6 | None | 60 | 2 | 5 |
| Example 2-13 | 175 | 0.53 | 0.02 | 0.08 | 1 | None | 100 | 0 | 0 |

6. Production of Other Liquid Crystal Display Devices

The polarizing plate of the present invention was used in a liquid crystal display device described in Example 1 of Japanese Laid-Open Patent Publication No. 10-48420, an oriented film coated with a polyvinyl alcohol and an optical anisotropic layer containing discotic liquid crystal molecules described in Example 1 of Japanese Laid-Open Patent Publication No. 9-26572, a 20-inch VA-mode liquid crystal display device shown in FIGS. 2 to 9 of Japanese Laid-Open Patent Publication No. 2000-154261, a 20-inch OCB-mode liquid crystal display device shown in FIGS. 10 to 15 of Japanese Laid-Open Patent Publication No. 2000-154261, and an IPS-mode liquid crystal display device shown in FIG. 11 of Japanese Laid-Open Patent Publication No. 2004-12731. The low refractive film according to the present invention was attached to the outermost layer of each of the liquid crystal display devices, and evaluated. As a result, excellent liquid crystal display properties could be obtained.

7. Preparation of Low Refractive Film

The stretched thermoplastic film of the present invention was used for preparing a low refractive film according to Example 47 of Kokai Giho (JIII Journal of Technical Disclosure) No. 2001-1745. As a result, the low refractive film exhibited excellent optical properties.

Although certain preferred embodiments of the present invention have been shown and described in detail, it should be understood that various changes and modifications may be made therein without departing from the scope of the appended claims.

What is claimed is:

1. A method for heat-treating a thermoplastic film, comprising,
after transversely stretching a thermoplastic film, transporting said thermoplastic film in a heat-treating zone using two or more transporting rolls,
wherein a ratio (G/D) of an inter-roll distance (G) to a roll lap length (D) is 0.01 to 3, and a ratio (V2/V1) of an exit-side transporting speed (V2) to an entry-side transporting speed (V1) is 0.6 to 0.82, and
wherein an Rth/Re ratio of a thickness direction retardation (Rth) to an in-plate retardation (Re) is at least 0.5 and less than 1, and the Rth/Re ratio range is 0.01 to 0.1 in a width direction.

2. A method according to claim 1, wherein said ratio (G/D) of said inter-roll distance (G) to said roll lap length (D) is 0.05 to 0.9.

3. A method according to claim 1, wherein both ends of said thermoplastic film are fixed on said transporting rolls.

4. A method according to claim 1, wherein said thermoplastic film is heat-treated at (Tg−20)° C. to (Tg+50)° C., in which Tg is a glass transition temperature of said thermoplastic film.

5. A method according to claim 1, wherein a stretching magnification of the transverse stretching is 1.1 to 3 times.

6. A method according to claim 1, wherein said thermoplastic film comprises a cellulose acylate, a cycloolefin, a lactone ring-containing polymer, or a polycarbonate.

7. A method according to claim 1, wherein said thermoplastic film is formed by a melt film forming method.

8. A method according to claim 1, wherein said thermoplastic film has a surface roughness (Ra) of 0.005 to 0.04 μm.

9. A method according to claim 1, wherein said thermoplastic film is formed by a touch roll film forming method.

10. A method according to claim 1, wherein said thermoplastic film has an in-plate retardation (Re) of 50 to 150 nm after the heat treatment.

11. A method for producing a thermoplastic film comprising,
after transversely stretching a thermoplastic film, transporting said thermoplastic film in a heat-treating zone using two or more transporting rolls,
wherein a ratio (G/D) of an inter-roll distance (G) to a roll lap length (D) is 0.01 to 3, and a ratio (V2/V1) of an exit-side transporting speed (V2) to an entry-side transporting speed (V1) is 0.6 to 0.82, and
wherein an Rth/Re ratio of a thickness direction retardation (Rth) to an in-plate retardation (Re) is at least 0.5 and less than 1, and the Rth/Re ratio range is 0.01 to 0.1 in a width direction.

* * * * *